(12) United States Patent
Jun et al.

(10) Patent No.: US 12,047,563 B2
(45) Date of Patent: Jul. 23, 2024

(54) METHOD AND APPARATUS FOR ENCODING AND DECODING IMAGE, AND RECORDING MEDIUM FOR STORING BITSTREAM

(71) Applicant: INTELLECTUAL DISCOVERY CO., LTD., Seoul (KR)

(72) Inventors: Dong San Jun, Daejeon (KR); Ha Hyun Lee, Seoul (KR); Jung Won Kang, Daejeon (KR); Hyun Suk Ko, Daejeon (KR); Sung Chang Lim, Daejeon (KR); Jin Ho Lee, Daejeon (KR); Seung Hyun Cho, Daejeon (KR); Hui Yong Kim, Daejeon (KR); Jin Soo Choi, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 17/941,182

(22) Filed: Sep. 9, 2022

(65) Prior Publication Data

US 2023/0071970 A1  Mar. 9, 2023

Related U.S. Application Data

(63) Continuation of application No. 16/336,264, filed as application No. PCT/KR2017/010652 on Sep. 26, 2017, now Pat. No. 11,477,442.

(30) Foreign Application Priority Data

Oct. 4, 2016 (KR) .................. 10-2016-0127876

(51) Int. Cl.
H04N 19/176 (2014.01)
H04N 19/109 (2014.01)
(Continued)

(52) U.S. Cl.
CPC ......... *H04N 19/109* (2014.11); *H04N 19/117* (2014.11); *H04N 19/119* (2014.11);
(Continued)

(58) Field of Classification Search
CPC .. H04N 19/109; H04N 19/117; H04N 19/119; H04N 19/132; H04N 19/172;
(Continued)

(56) References Cited

U.S. PATENT DOCUMENTS

2004/0218675 A1  11/2004 Kim et al.
2013/0188720 A1   7/2013 Wang et al.
(Continued)

FOREIGN PATENT DOCUMENTS

CN    101355708 A    1/2009
CN    101647281 A    2/2010
(Continued)

OTHER PUBLICATIONS

International Search Report issued on Jan. 18, 2019 in corresponding International Patent Application No. PCT/KR/2017/010652 (10 pages in English).

*Primary Examiner* — Hesham K Abouzahra
(74) *Attorney, Agent, or Firm* — BROADVIEW IP LAW, PC

(57) ABSTRACT

An image encoding method and an image decoding method are provided. The image decoding method includes deriving a temporal merge candidate from a co-located block of a current block, generating a merge candidate list of the current block based on the derived temporal merge candidate, and generating a prediction block of the current block based on the generated merge candidate list. The deriving a temporal merge candidate includes scaling a motion vector derived from the co-located block based on a POC difference value between the current block and a reference picture of (Continued)

the current block and a POC difference value between the co-located block and a reference picture of the co-located block, and modifying the scaled motion vector based on motion vector scaling information between a neighboring block of the current block and a co-located block of the neighboring block.

7 Claims, 9 Drawing Sheets

(51) Int. Cl.
| | |
|---|---|
| *H04N 19/117* | (2014.01) |
| *H04N 19/119* | (2014.01) |
| *H04N 19/132* | (2014.01) |
| *H04N 19/172* | (2014.01) |
| *H04N 19/174* | (2014.01) |
| *H04N 19/182* | (2014.01) |
| *H04N 19/513* | (2014.01) |
| *H04N 19/86* | (2014.01) |
| *H04N 19/91* | (2014.01) |

(52) U.S. Cl.
CPC ......... *H04N 19/132* (2014.11); *H04N 19/172* (2014.11); *H04N 19/174* (2014.11); *H04N 19/176* (2014.11); *H04N 19/182* (2014.11); *H04N 19/513* (2014.11); *H04N 19/86* (2014.11); *H04N 19/91* (2014.11)

(58) Field of Classification Search
CPC .. H04N 19/174; H04N 19/176; H04N 19/182; H04N 19/513; H04N 19/86; H04N 19/91
See application file for complete search history.

(56) References Cited

U.S. PATENT DOCUMENTS

| | | |
|---|---|---|
| 2014/0016701 A1 | 1/2014 | Chen et al. |
| 2014/0140409 A1 | 5/2014 | Kim et al. |
| 2014/0307789 A1 | 10/2014 | Kim et al. |
| 2015/0139323 A1 | 5/2015 | Lee et al. |
| 2016/0165263 A1 | 6/2016 | Zhang et al. |
| 2016/0366435 A1 | 12/2016 | Chien et al. |
| 2019/0246133 A1* | 8/2019 | Lee ........................ H04N 19/50 |

FOREIGN PATENT DOCUMENTS

| | | |
|---|---|---|
| CN | 103370940 A | 10/2013 |
| CN | 104853217 A | 8/2015 |
| KR | 10-0772576 B1 | 11/2007 |
| KR | 10-2013-0047651 A | 5/2013 |
| KR | 10-2014-0029345 A | 3/2014 |
| KR | 10-2015-0070848 | 6/2015 |
| KR | 10-2016-0097160 A | 8/2016 |
| KR | 10-2015-0105346 A | 9/2016 |
| WO | 2011/128365 A1 | 10/2011 |
| WO | 2013/051899 A2 | 4/2013 |
| WO | WO 2013/109093 A1 | 7/2013 |
| WO | WO 2014/081261 A1 | 5/2014 |
| WO | 2014/163468 A1 | 10/2014 |

* cited by examiner

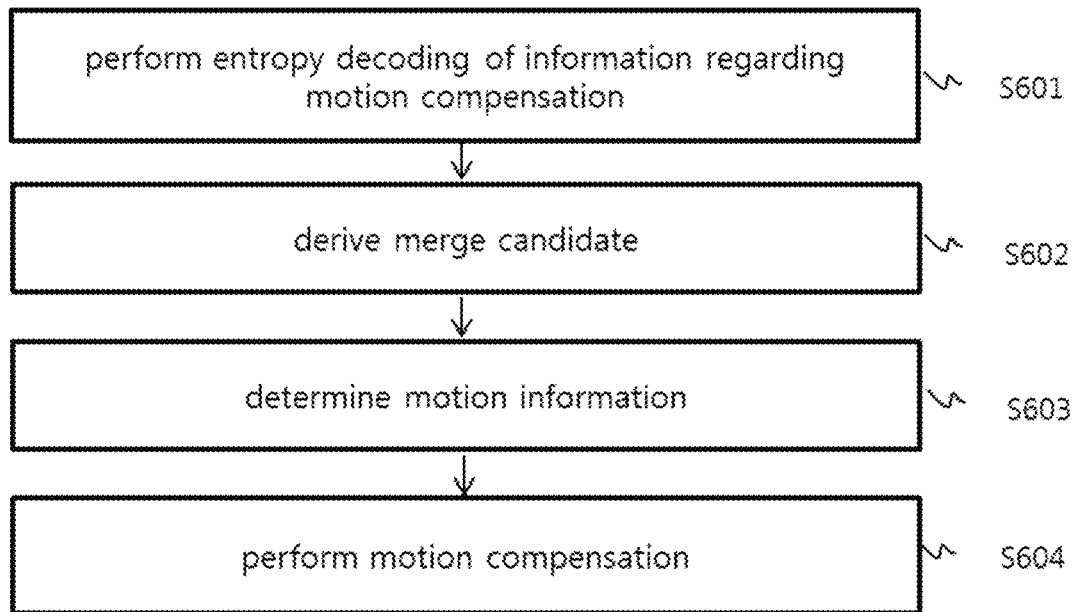
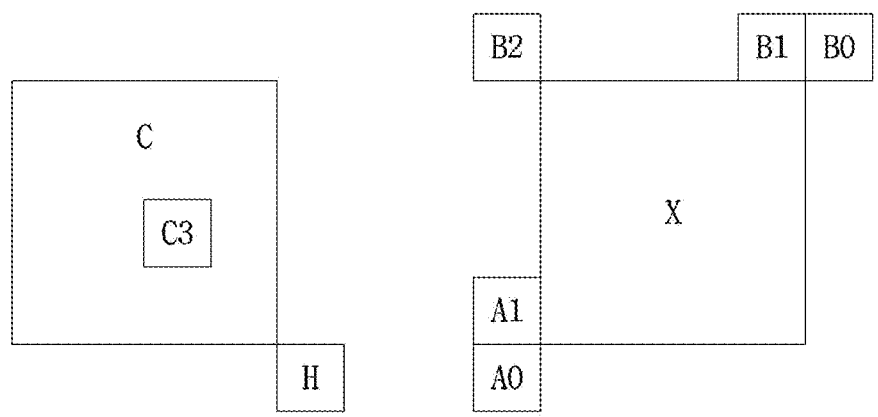

METHOD AND APPARATUS FOR ENCODING AND DECODING IMAGE, AND RECORDING MEDIUM FOR STORING BITSTREAM

TECHNICAL FIELD

The present invention relates to a method and apparatus for encoding/decoding an image and a recording medium in which a bitstream is stored. More specifically, the present invention relates to a high efficiency image encoding/decoding method and apparatus based on inter-picture prediction and a recording medium in which a bit stream generated by the image encoding/decoding method and apparatus is stored.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

Accordingly, an objective of the present invention is to provide a high efficiency image encoding/decoding method and apparatus.

Another objective of the present invention is to provide a high efficiency image encoding/decoding method and apparatus based on inter-picture prediction.

Technical Solution

The prevent invention provides an image decoding method including: deriving a temporal merge candidate from a co-located block of a current block; generating a merge candidate list of the current block based on the derived temporal merge candidate; and generating a prediction block of the current block based on the generated merge candidate list, wherein the deriving a temporal merge candidate comprises: scaling a motion vector derived from the co-located block based on a picture order count (POC) difference value between the current block and a reference picture of the current block and a POC difference value between the co-located block and a reference picture of the co-located block; and modifying the scaled motion vector based on motion vector scaling information between neighboring blocks of the current block and co-located blocks of the neighboring blocks.

In the image decoding method, the deriving a temporal merge candidate may include: scaling a motion vector derived from the co-located block of the neighboring block, based on a POC difference value between the neighboring block and a reference picture of the neighboring block and a POC difference value between the co-located block of the neighboring block and a reference picture of the co-located block of the neighboring block; and generating motion vector scaling information between the neighboring block and the co-located block of the neighboring block based on a ratio of a motion vector derived from the co-located block of the neighboring block and then scaled and a motion vector of the neighboring block.

In the image decoding method, the modifying the scaled motion vector may be performed by applying a weighted value based on the motion vector scaling information between the neighboring block and the co-located block of the neighboring block to the scaled motion vector.

In the image decoding method, the POC difference value between the current block and the reference picture of the current block differs from the POC difference value between the neighboring block and the reference picture of the neighboring block, the weighted value may be modified based on a difference value between the POC difference values.

In the image decoding method, the neighboring block may be selected among spatial neighboring blocks of the current block and temporal neighboring blocks of the current block based on neighboring block position information.

In the image decoding method, the neighboring block may be a block that is selected among spatial neighboring blocks of the current block and has a reference picture the same as the reference picture of the current block.

The present invention provides an image encoding method including: deriving a temporal merge candidate from a co-located block of a current block; generating a merge candidate list of the current block, based on the derived temporal merge candidate; and generating a prediction block of the current block, based on the generated merge candidate list, wherein the deriving a temporal merge candidate includes: scaling a motion vector derived from the co-located block, based on a POC difference value between the current block and a reference picture of the current block and a POC difference value between the co-located block and a reference picture of the co-located block; and modifying the scaled motion vector, based on motion vector scaling information between spatial and temporal neighboring blocks of the current block and co-located blocks of the spatial and temporal neighboring blocks.

The present invention provides a recording medium capable of storing bitstream generated through the image encoding method and the image decoding method described above.

According to one aspect, the present invention provides an image decoding method including: acquiring an inter-picture prediction indicator indicating an inter-picture prediction direction and an inter-picture prediction mode; and generating a prediction block of a current block based on the inter-picture prediction indicator, wherein the inter-picture prediction indicator indicates the inter-picture prediction mode for each prediction direction..

The present invention provides an image encoding method including: determining an inter-picture prediction mode for each inter-picture prediction direction; and encoding the inter-picture prediction indicator indicating an inter-picture prediction direction and an inter-picture prediction mode according to a result of the determining.

The present invention provides a recording medium being capable of storing a bitstream generated through the encoding method described above.

The present invention provides an image decoding apparatus including: a motion compensation unit deriving a temporal merge candidate from a co-located block of a current block, generating a merge candidate list based on the derived temporal merge candidate, and generating a prediction block of the current block based on the generated merge candidate list, wherein the motion compensation unit performs: scaling a motion vector derived from the co-located block based on a POC difference value between the current block and a reference picture of the current block and a POC difference value between the co-located block and a reference picture of the co-located block; and modifying the scaled the motion vector based on motion vector scaling information between a neighboring block of the current block and a co-located block of the neighboring block..

The present invention provides an image decoding apparatus including: an entropy decoding unit acquiring an inter-picture prediction indicator indicating an inter-picture prediction direction and an inter-picture prediction mode; and a motion compensation unit generating a prediction block of a current block based on the inter-picture prediction indicator.

Advantageous Effects

As described above, according to the present invention, a method and apparatus for encoding/decoding images with high compression efficiency can be provided.

In addition, according to the present invention, a high efficiency method and apparatus for encoding/decoding images based on inter-picture prediction can be provided.

In addition, according to the present invention, a recording medium in which a bitstream generated by the image encoding/decoding method and apparatus is stored can be provided.

DESCRIPTION OF DRAWINGS

FIG. 6 is a flowchart illustrating an image decoding method using the merge mode according to the present invention;

FIG. 7 is a diagram illustrating an example of a method of deriving spatial merge candidates and temporal merge candidates of a current block, according to the present invention;

MODE FOR CARRYING OUT THE INVENTION

Figure 1:
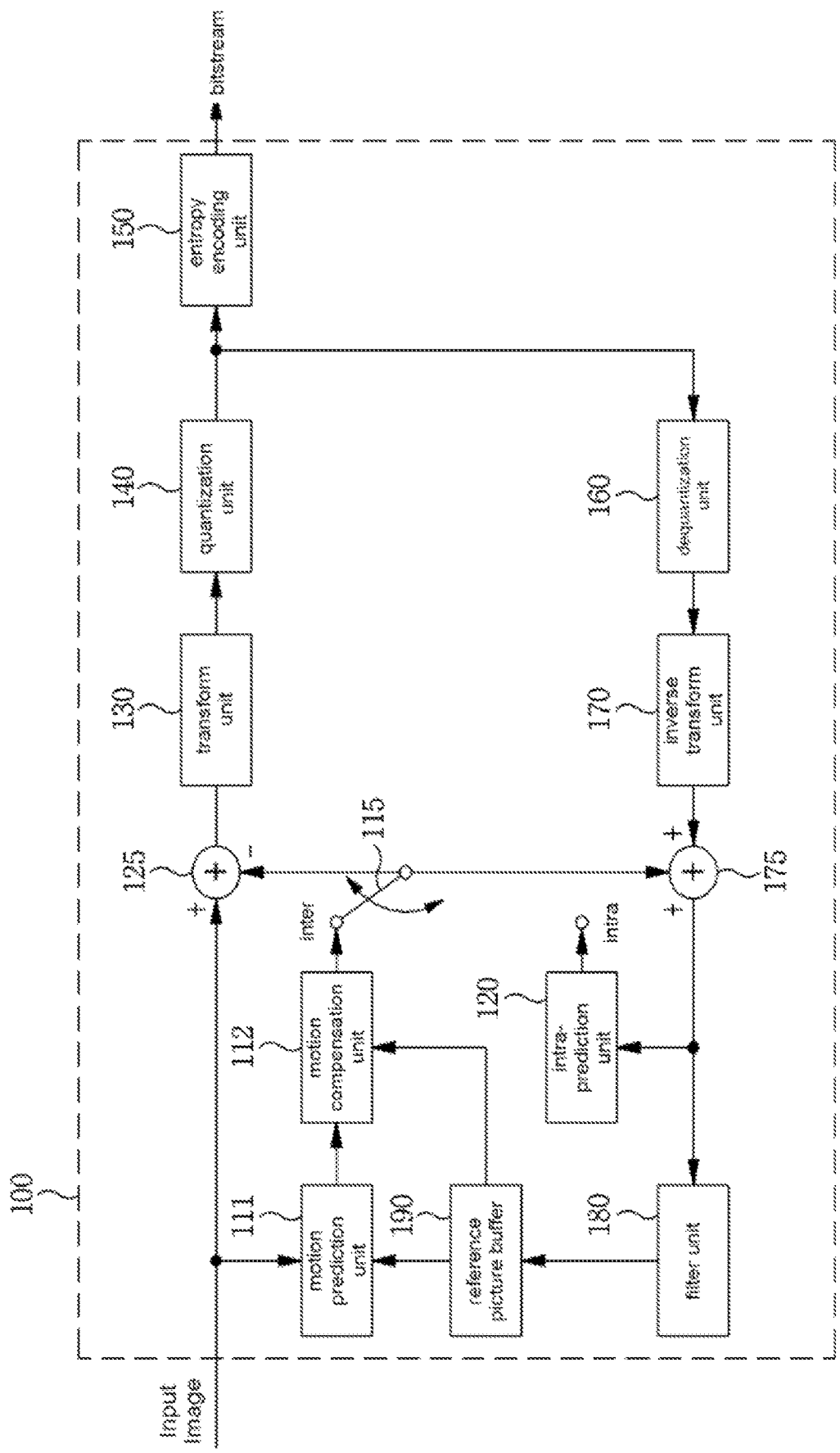
FIG. 1 is a block diagram illustrating the construction of an encoding apparatus according to one embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

DESCRIPTION OF TERMS

Encoder: means an apparatus performing encoding.

Decoder: means an apparatus performing decoding.

Block: means an M×N sample array. Herein, M and N mean positive integers, and the block may mean a sample array of a two-dimensional form. The block may refer to a unit. A current block my mean an encoding target block that becomes a target when performing encoding, or a decoding target block that becomes a target when performing decoding. In addition, the current block may be at least one of a coding block, a prediction block, a residual block, and a transform block.

Sample: is a basic unit constituting a block. It may be expressed as a value in a range of from 0 to 2Bd-1 according to a bit depth (Bd). In the present invention, the sample may have the same meaning as a pixel.

Unit: refers to a basic unit in image encoding and image decoding. When encoding and decoding an image, the unit may be a region generated by partitioning a single image. In addition, the unit may mean a subdivided unit when a single image is partitioned into subdivided units during encoding or decoding. When encoding and decoding an image, a predetermined process may be performed for each unit. A single unit may be partitioned into sub-units that have smaller sizes than the unit. Depending on functions, the unit may mean a block, a macroblock, a coding tree unit, a coding tree block, a coding unit, a coding block, a prediction unit, a prediction block, a residual unit, a residual block, a transform unit, a transform block, etc. In addition, in order to distinguish a unit from a block, the unit may include a luma component block, a chroma component block associated with the luma component block, and a syntax element of each color component block. The units may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is composed of one luma component coding tree block Y and two chroma component coding tree blocks Cb and Cr associated with the luma component coding tree block Y. In addition, it may be construed to include the blocks and syntax elements of the respective blocks. Each coding tree unit may be partitioned by using at least one of a quad-tree partitioning method and a binary-tree partitioning method to generate a lower-level unit such as a coding unit, a prediction unit, a transform unit, etc. It may be used as a term for designating a pixel block that becomes a unit for each process such as partitioning an input image when performing encoding/decoding.

Coding Tree Block: may be used as a term for designating any one of a Y coding tree block, a Cb coding tree block, and a Cr coding tree block.

Neighboring Block: means a block adjacent to a current block. The block adjacent to the current block may mean a block that comes into contact with a boundary of the current block, or a block positioned within a predetermined distance from the current block. The neighboring block may mean a block adjacent to a vertex of the current block. Herein, the block adjacent to the vertex of the current block may mean a block vertically adjacent to a neighboring block that is horizontally adjacent to the current block, or a block horizontally adjacent to a neighboring block that is vertically adjacent to the current block.

Reconstructed Neighboring Block: means a neighboring block that is spatially or temporally adjacent to a current block and which has been already encoded or decoded. Herein, the reconstructed neighboring block may mean a reconstructed neighboring unit. A reconstructed spatial neighboring block may be a block that is disposed within a current picture and which has been already reconstructed through encoding and/or decoding. A reconstructed temporal neighbor block is a block that is disposed within a reference picture and located at the same position as the current block of the current picture, and which has been already reconstructed, or a neighboring block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bit string including coded image information.

Parameter Set: corresponds to header information within the structure of a bitstream. At least one of a video parameter set, a sequence parameter set, a picture parameter set, and an adaptation parameter set may be included in a parameter set. In addition, a parameter set may include slice header information and tile header information.

Parsing: may mean determining a value of a syntax element by performing entropy decoding on a bitstream, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-picture prediction, intra-picture prediction, inter-picture compensation, intra-picture compensation, and motion compensation. A single prediction unit may be partitioned into a plurality of partitions with a smaller size, or may be partitioned into prediction sub-units with a smaller size.

Prediction Unit Partition: means a form obtained by partitioning a prediction unit.

Reference Picture List: means a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Reference Picture Index: means an index indicating a specific reference picture in a reference picture list.

Reference Picture: may mean a picture to which a specific block refers for inter-picture prediction or motion compensation.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list of motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: means a list composed of merge candidates.

Merge Candidate: means a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: means information indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: means a basic unit used when encoding or decoding a residual signal, for example, when performing transform, reverse transform, quantization, dequantization, or transform coefficient encoding/decoding. One transform unit may be partitioned into a plurality of smaller transform units.

Scaling: means a process of multiplying a transform coefficient level by a factor. A transform coefficient may be generated by scaling a transform coefficient level. The scaling also may be referred to as dequantization.

Quantization Parameter: may mean a value used when generating a transform coefficient level of a transform coefficient during quantization. The quantization parameter also may mean a value used when generating a transform coefficient by scaling a transform coefficient level during dequantization. The quantization parameter may be a value mapped on a quantization step size.

Delta Quantization Parameter: means a difference value between a predicted quantization parameter and a quantization parameter of an encoding/decoding target unit.

Scan: means a method of sequencing coefficients within a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: means a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: means a transform coefficient having a value other than zero, or a transform coefficient level having a value other than zero.

Quantization Matrix: means a matrix used in a quantization process or a dequantization process performed to improve subjective or objective image quality. The quantization matrix also may be referred to as a scaling list.

Quantization Matrix Coefficient: means each element within a quantization matrix. The quantization matrix coefficient also may be referred to as a matrix coefficient.

Default Matrix: means a predetermined quantization matrix preliminarily defined in an encoder or a decoder.

Non-default Matrix: means a quantization matrix that is not preliminarily defined in an encoder or a decoder but is signaled by a user.

FIG. 1 is a block diagram illustrating the construction of an encoding apparatus according to one embodiment of the present invention.

An encoding apparatus 100 may be an encoder, a video encoding apparatus, or an image encoding apparatus. A video may include one or more images (or pictures). The encoding apparatus 100 can sequentially encode one or more pictures.

With reference to FIG. 1, the encoding apparatus 100 includes a motion prediction unit 111, a motion compensation unit 112, an intra-prediction unit 120, a switch 115, a subtractor 125, a transform unit 130, a quantization unit 140, an entropy encoding unit 150, a dequantization unit 160, a reverse-transform unit 170, an adder 175, a filter unit 180, and a reference picture buffer 190.

The encoding apparatus 100 can perform encoding on an input picture using an intra mode and/or an inter mode. The encoding apparatus 100 may generate a bitstream by encoding an input picture and output the generated bitstream. The generated bitstream may be recorded on a computer-readable recording medium or streamed via a wired or wireless transmission medium. When an intra mode is used as a prediction mode, the switch 115 may be switched to intra. Meanwhile, when an inter mode is used as a prediction mode, the switch 115 may be switched to inter. Here, the intra mode may mean an intra-picture prediction mode, and the inter mode may mean an inter-picture prediction mode. The encoding apparatus 100 may generate a prediction block of an input block of an input picture. After the prediction block is generated, the encoding apparatus 100 may encode a residual between the input block and the prediction block. The input picture can be referred to as a current picture that is an encoding target picture to undergo current encoding. The input block can be referred to as a current block or an encoding target block to undergo current encoding.

When the prediction mode is the intra mode, the intra-prediction unit 120 may use a pixel value of a neighboring block that has been already encoded or decoded as a reference pixel. The intra-prediction unit 120 may perform spatial prediction on the input block by using the reference pixel, and generate prediction samples of the input block through the spatial prediction. Here, the intra-prediction may mean intra-picture prediction.

When the prediction mode is the inter mode, the motion prediction unit 111 may search a reference picture for a region that best matches the input block during a motion prediction process, and derive a motion vector using the searched region. The reference picture may be stored in the reference picture buffer 190.

The motion compensation unit 112 may generate a prediction block by performing motion compensation using a motion vector. Here, the inter-prediction may mean inter-picture prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference between the input block and the prediction block. The residual block may be referred to as a residual signal. The residual signal may mean a difference between an original signal and a prediction signal. Alternatively, the residual signal may mean a signal obtained by transforming, or quantizing, or transforming and quantizing the difference between the original signal and the prediction signal. The residual block may be a residual signal obtained in the units of a block.

The transform unit 130 may generate a transform coefficient by transforming the residual block, and may output the generated transform coefficient. Here, the transform coefficient may be a coefficient value generated by transforming the residual block. When the transform skip mode is used, the transform unit 130 may not perform the transform on the residual block.

A quantized level may be generated by applying quantization to the transform coefficient or the residual signal. Hereinafter, the quantized level also may be referred to as the transform coefficient in the embodiment of the present invention.

The quantization unit 140 may generate the quantized level by quantizing the transform coefficient or the residual signal depending on the quantization parameter, and may output the quantized level. Here, the quantization unit 140 may quantize the transform coefficient by using a quantization matrix.

The entropy encoding unit 150 may generate a bitstream by performing entropy encoding according to probability distribution, on values calculated by the quantization unit 140 or on coding parameter values calculated in an encoding process, etc., and may output the generated bitstream. The entropy encoding unit 150 also may perform entropy encoding on information on a pixel of an image and information on image decoding. For example, the information on image decoding may include a syntax element, etc.

When entropy encoding is applied, symbols are represented such that a smaller number of bits are allocated to symbols having a higher occurrence probability and a larger number of bits are allocated to symbols having a lower occurrence probability. Thereby the size of the bitstream of encoding target symbols can be reduced. For the entropy encoding, the entropy encoding unit 150 may use an encoding method such as exponential Golomb, context-adaptive variable length coding (CAVLC), or context-adaptive binary arithmetic coding (CABAC). For example, the entropy encoding unit 150 may perform entropy encoding by using a variable length coding/code (VLC) table. In addition, the entropy encoding unit 150 may derive a binarization method of a target symbol and a probability model of a target symbol/bin, and may perform arithmetic coding by using the derived binarization method, the derived probability model, or the derived context model thereafter.

In order to encode the transform coefficient level, the entropy encoding unit 150 may change a two-dimensional block form coefficient into a one-dimensional vector form coefficient by using a transform coefficient scanning method.

The coding parameters may include not only information (flag, index, etc.), such as a context syntax, which is encoded by the encoder and is signaled to the decoder but also information derived during an encoding process or a decoding process. The coding parameters may further include information that is required when encoding or decoding an image. For example, the coding parameters may include at least any one of or at least one combination of a unit or block size, a unit or block depth, unit or block partition information, a unit or block partition structure, information about whether quad-tree form partitioning is performed, information about whether binary-tree form portioning is performed, a direction (horizontal direction or vertical direction) of binary-tree form partitioning, a partition type of a binary-tree form (symmetric partition or asymmetric partition), a mode of intra-picture prediction, a direction of intra-picture prediction, a reference sample filtering method, a prediction block filtering method, a prediction block filter tap, a prediction block filter coefficient, a mode of inter-picture prediction, motion information, a motion vector, a reference picture index, a direction of inter-picture prediction, an inter-picture prediction indicator, a reference picture list, a reference picture, a motion vector prediction candidate, a motion vector candidate list, information about whether or not a motion merge mode is used, a merge candidate, a merge candidate list, information about whether or not a kip mode is used, an interpolation filter type, an interpolation filter tap, an interpolation filter coefficient, a motion vector size, a motion vector representation, accuracy of a motion vector representation, a transform type, a transform size, information about whether primary transform is used, information about whether secondary transform is used, a primary transform index, a secondary transform index, information about whether or not a residual signal is present, a coded block pattern, a coded block flag, a quantization parameter, a quantization matrix, information about whether an intra-loop filter is applied, an intra-loop filter coefficient, an intra-loop filter tap, shape/form of an intra-loop filter, information about whether a deblocking filter is applied, a deblocking filter coefficient, a deblocking filter tap, a deblocking filter intensity, shape/form of a deblocking filter, information about whether an adaptive sample offset is applied, an adaptive sample offset value, an adaptive sample offset category, an adaptive sample offset type, information about whether an adaptive in-loop filter is applied, an adaptive in-loop filter coefficient, an adaptive in-loop filter tap, shape/form of an adaptive in-loop filter, a binarization/inverse binarization method, a context model determination method, a context model updating method, information about whether a regular mode is performed, information about whether a bypass mode is performed, a context bin, a bypass bin, a transform coefficient, a transform coefficient level, a transform coefficient level scanning method, a display/output order of images, slice identification information, a slice type, slice partition information, tile identification information, a tile type, tile partition information, a picture type, a bit depth, and information about a luma signal or a chroma signal.

Herein, the expression 'signaling a flag or an index' means an operation that a flag or an index is subjected to entropy encoding and is then added to the bitstream in the encoder, or an operation that a flag or an index included in a bitstream is subjected to entropy decoding in the decoder.

When the encoding apparatus 100 performs encoding based on inter-picture prediction, an encoded current picture may be used as a reference picture for encoding of another picture. Accordingly, the encoding apparatus 100 may reconstruct or decode the encoded current picture, and may store the reconstructed or decoded picture as a reference picture.

A quantized level may be dequantized by the dequantization unit 160, and may be inversely transformed by the inverse transform unit 170. The dequantized and inversely transformed coefficient may be added to the prediction block by the adder 175. A reconstructed block can be generated by adding the dequantized or inversely transformed coefficient to the prediction block. Herein, the dequantized and/or inversely transformed coefficient may mean a coefficient which has undergone dequantization, inverse transform, or both, or alternatively mean a reconstructed residual block.

The reconstructed block may pass the filter unit 180. The filter unit 180 may apply at least one of a deblocking filter, a sample adaptive offset (SAO) filter, and an adaptive loop filter (ALF) to the reconstructed block or the reconstructed picture. The filter unit 180 may be referred to as an in-loop filter.

The deblocking filter may remove block distortion that occurs at the boundaries between the blocks. When determining whether to apply the deblocking filter, a determination of whether to apply the deblocking filter to the current block is performed based on the pixels included in several rows or columns in the current block. When the deblocking filter is applied, a strong filter or a weak filter may be applied depending on required deblocking filtering strength.

The sample adaptive offset may be used to add an optimum offset value to the pixel value in order to compensate for an encoding error. The sample adaptive offset may correct an offset between the deblocking-filtered picture and the original picture in the units of a pixel. In order to perform the offset correction on a specific picture, it is possible to use a method of dividing the pixels of an image into a predetermined number of regions, determining a region to undergo the offset correction, and applying the offset correction to the determined region, or a method of applying an offset in consideration of edge information of each pixel.

The adaptive loop filter may perform filtering on the basis of a value obtained by comparing the reconstructed picture and the original picture. The pixels of an image may be partitioned into a predetermined number of groups, and one filter to be applied to a corresponding group of the groups is determined. In this way, different filters may be applied to the groups. Information about whether or not to apply the adaptive loop filter is may be signaled for each coding unit (CU). The shape and filter coefficient of an adaptive loop filter being applied to each block may vary.

The reconstructed block or the reconstructed picture that has passed through the filter unit 180 may be stored in the reference picture buffer 190.

Figure 2:
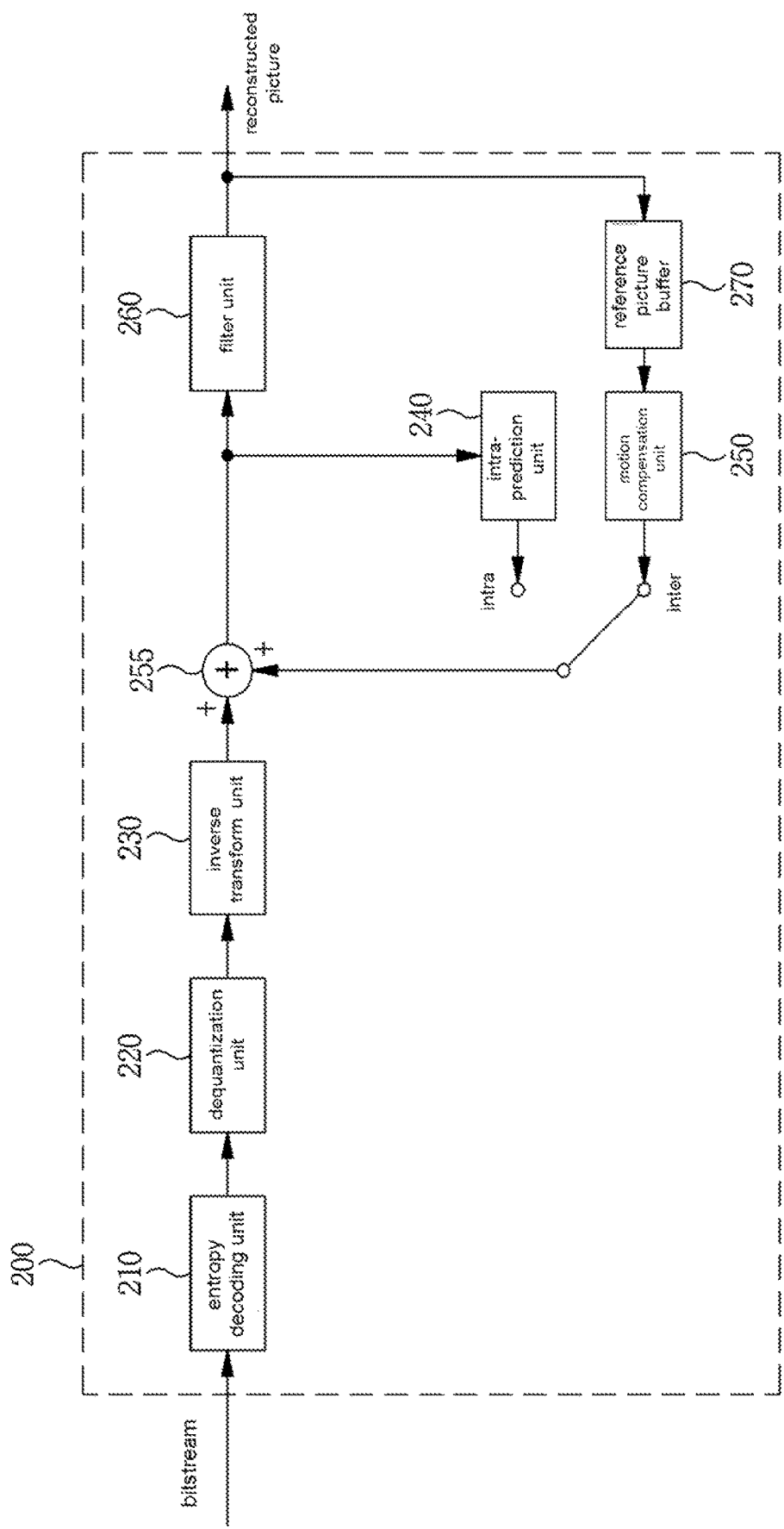
FIG. 2 is a block diagram illustrating the construction of an image decoding apparatus according to one embodiment of the present invention.

FIG. 2 is a block diagram illustrating the construction of a decoding apparatus according to an embodiment of the present invention.

The decoding apparatus 200 may be a decoder, a video decoding apparatus, or an image decoding apparatus.

Referring to FIG. 2, the decoding apparatus 200 may include an entropy decoding unit 210, a dequantization unit 220, a reverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream read out from a computer readable recording medium, or a bitstream streamed through a wired or wireless transmission medium. The decoding apparatus 200 may decode the bitstream using the intra mode or the inter mode. The decoding apparatus 200 may generate a reconstructed picture or a decoded picture by performing decoding, and may output the reconstructed picture or the decoded picture.

When a prediction mode used for the decoding is the intra mode, the switch may be switched to intra. Meanwhile, when the prediction mode used for the decoding is the inter mode, the switch may be switched to inter.

The decoding apparatus 200 may acquire a reconstructed residual block by decoding an input bitstream, and may generate a prediction block. When the reconstructed residual block and the prediction block are acquired, the decoding apparatus 200 may generate a reconstructed block, which is a decoding target block, by adding the reconstructed residual block and the prediction block. The decoding target block may be referred to as a current block.

The entropy decoding unit 210 performs entropy decoding on the bitstream according the probability distribution, thereby generating symbols. The generated symbols may include a symbol of a quantized level form. Here, the entropy decoding method may be a reverse process of the above-described entropy encoding method.

In order to decode the transform coefficient level, the entropy decoding unit 210 may perform transform coefficient scanning, thereby changing coefficients of a one-dimensional vector form into coefficients of a two-dimensional block form.

The quantized level may be dequantized by the dequantization unit 220, and may be inversely transformed by the inverse transform unit 230. When the quantized level is dequantized and/or inversely transformed, a reconstructed residual block is generated. Here, the dequantization unit 220 may apply a quantization matrix to the quantized level.

When the intra mode is used, the intra-prediction unit 240 may generate a prediction block by performing spatial prediction using a pixel value of a previously decoded block that is adjacent to a decoding target block.

When the inter mode is used, the motion compensation unit 250 may generate a prediction block by performing motion compensation using both the motion vector and the reference picture stored in the reference picture buffer 270. When the value of the motion vector is not an integer, the motion compensation unit 250 may generate the prediction block by applying the interpolation filter to a partial region of a reference picture. In order to perform motion compensation on a coding unit, it may be first determined that which mode among a skip mode, a merge mode, an AMVP mode, and a current picture reference mode is to be used for motion compensation of a prediction unit included in the corresponding coding unit, and the motion compensation may then be performed according to the determined mode.

The adder 255 may generate a reconstructed block by adding the reconstructed residual block and the prediction block. The filter unit 260 may apply at least one of the deblocking filter, the sample adaptive offset, and the adaptive loop filter to the reconstructed block or the reconstructed picture. The filter unit 260 may output the reconstructed picture. The reconstructed block or the reconstructed picture may be stored in the reference picture buffer 270 and may be used for inter-prediction thereafter.

Figure 3:
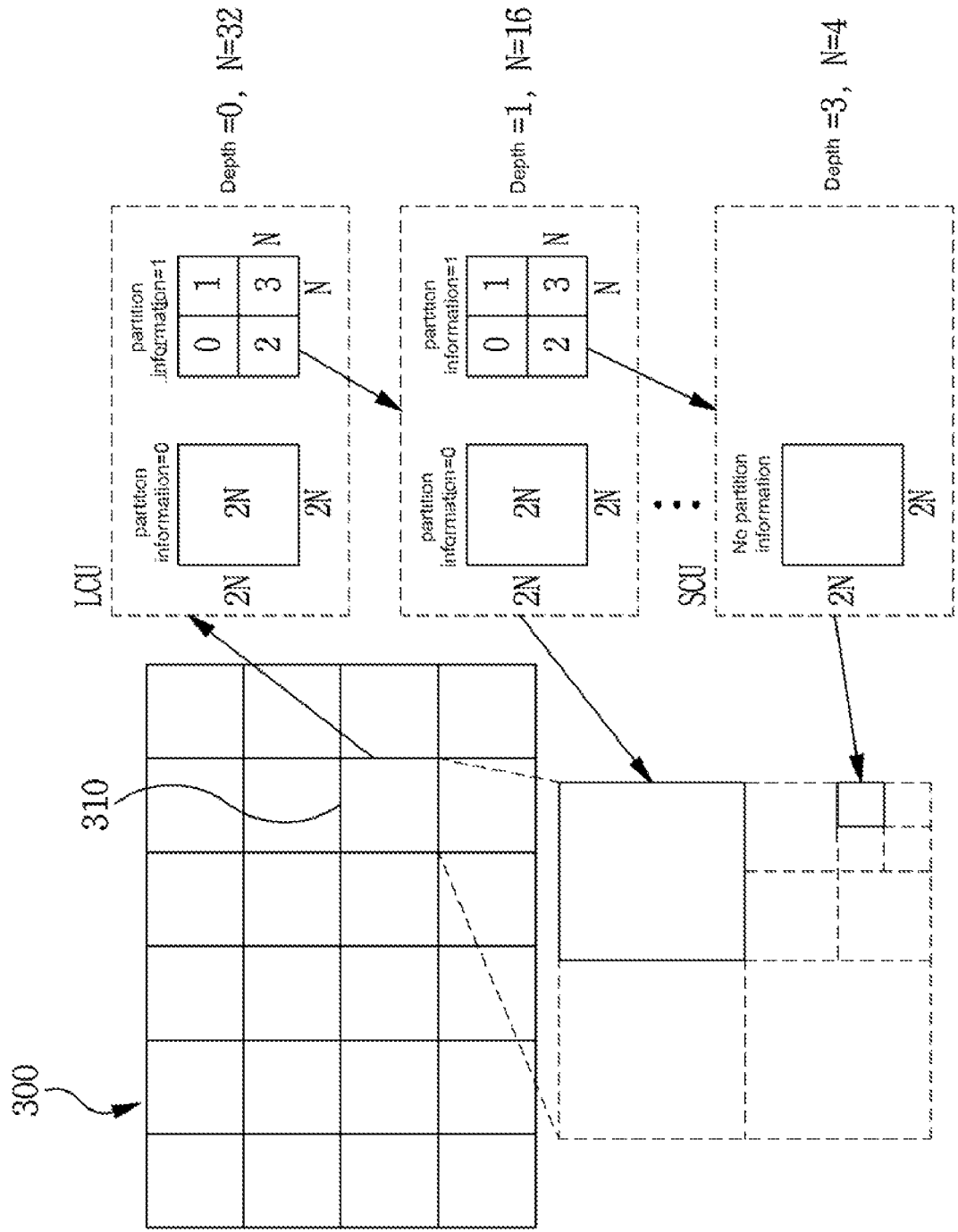
FIG. 3 is a diagram schematically illustrating a partition structure of an image used for encoding and decoding.

FIG. 3 is a diagram schematically illustrating a partition structure of an image for encoding or decoding the image. FIG. 3 schematically illustrates an embodiment in which one unit is partitioned into a plurality of sub-units.

In order to efficiently partition an image, a coding unit (CU) may be used in encoding and decoding. Here, the coding unit may be used as a basic unit for image encoding and image decoding. The coding unit also may be a unit for which the intra-picture mode or the inter-picture mode is determined when image encoding or decoding is performed. The coding unit may be a basic unit used for prediction, transform, quantization, inverse transform, dequantization, or transform coefficient encoding/decoding.

Referring to FIG. 3, a picture 300 is sequentially partitioned into largest coding units (LCUs), and a partition structure is determined for each LCU. Here, an LCU and a coding tree unit (CTU) may have the same meaning. Partitioning a unit may mean partitioning a block corresponding to the unit. Block partition information may include unit depth information. The depth information may indicate the number of times a unit is partitioned, a partitioned degree of a unit, or both. One unit may have depth information based on a tree structure and may be hierarchically partitioned. Each of the partitioned sub-units may have depth information. The depth information may be information about the size of a CU and may be stored for each CU.

The partition structure may mean the distribution of coding units (CU) in an LCU 310. The distribution may be determined depending on whether or not one CU will be partitioned into a plurality of (a positive integer equal to or greater than 2, such as, 2, 4, 8, 16, etc) CUs. The width and the length of the partitioned CU (sub-CU) may be respectively half the width and half the length of the original CU. The width and the length of each partitioned CU may be respectively smaller than the width and the length of the original CU, and are dependent on the number of partitioned CUs. The partitioned CU may be recursively partitioned into a plurality of further partitioned CUs. The partitioning may be recursively performed until a finally partitioned CU has a predefined depth or a predefined size. For example, the depth of the LCU may be zero. Alternatively, the depth of a smallest coding unit (SCU) may be a predefined maximum depth. Here, the LCU may be a coding unit having a maximum coding unit size as described above, and the SCU may be a coding unit having a minimum coding unit size. The partitioning starts from the LCU 310. Whenever the width and the length of the CU are decreased through the partitioning, the depth of a CU is incremented by one.

Information about whether a CU will be partitioned is represented as the partition information of a CU. The partition information may be 1-bit information. All of the CUs except the SCUs may have their own partition information. For example, one CU may not be partitioned when the value of the partition information of the CU is 1, but may be partitioned when the value of the partition information of the CU is 2.

Referring to FIG. 3, the LCU having a depth of 0 may be a block of 64×64 pixels. The value '0' may represent the minimum depth. The SCU having a depth of 3 may be a block of 8×8 pixels. The value '3' may be the maximum depth. A 32×32-pixel block and a 16×16-pixel block may be respectively represented to have a depth of 1 and a depth of 2.

For example, when one coding unit is partitioned into four smaller coding units, each of the partitioned four coding units has a width and a length that are respectively half the width and half the length of the original coding unit. For example, when one coding unit having a size of 32×32 pixels is partitioned into four smaller coding units, each of the partitioned four smaller coding units has a size of 16×16 pixels. When one coding unit is partitioned into four smaller coding units, it means that the coding unit is partitioned in a quad-tree form.

For example, when one coding unit is partitioned into two smaller coding units, each of the partitioned smaller coding units has a width or a length that is half the width or half the length of the original coding unit. For example, when one coding unit having a size of 32×32 pixels is partitioned into two smaller coding units, each of the partitioned smaller coding units has a size of 16×32 pixels. When one coding unit is partitioned into two smaller coding units, it means that the coding unit is partitioned in a binary-tree form. In FIG. 3, an LCU 320 is an example of an LCU to which both of the binary-tree form partitioning and the quad-tree form partitioning are applied.

Figure 4:
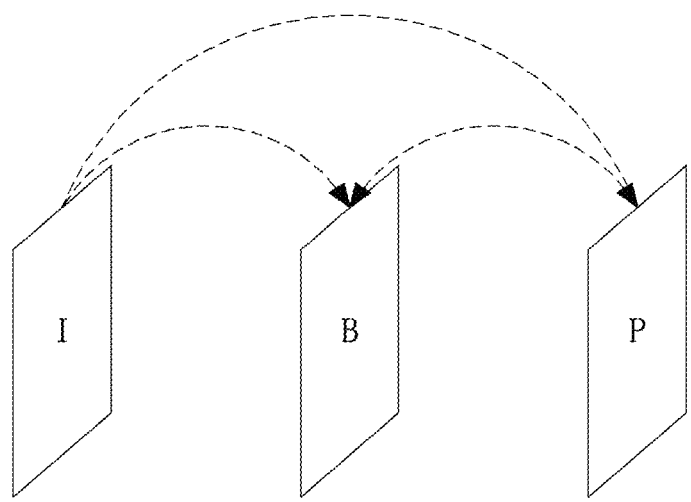
FIG. 4 is a diagram illustrating an embodiment of an inter-picture prediction process.

FIG. 4 is a diagram illustrating an embodiment of an inter-picture prediction process.

Figure 5:
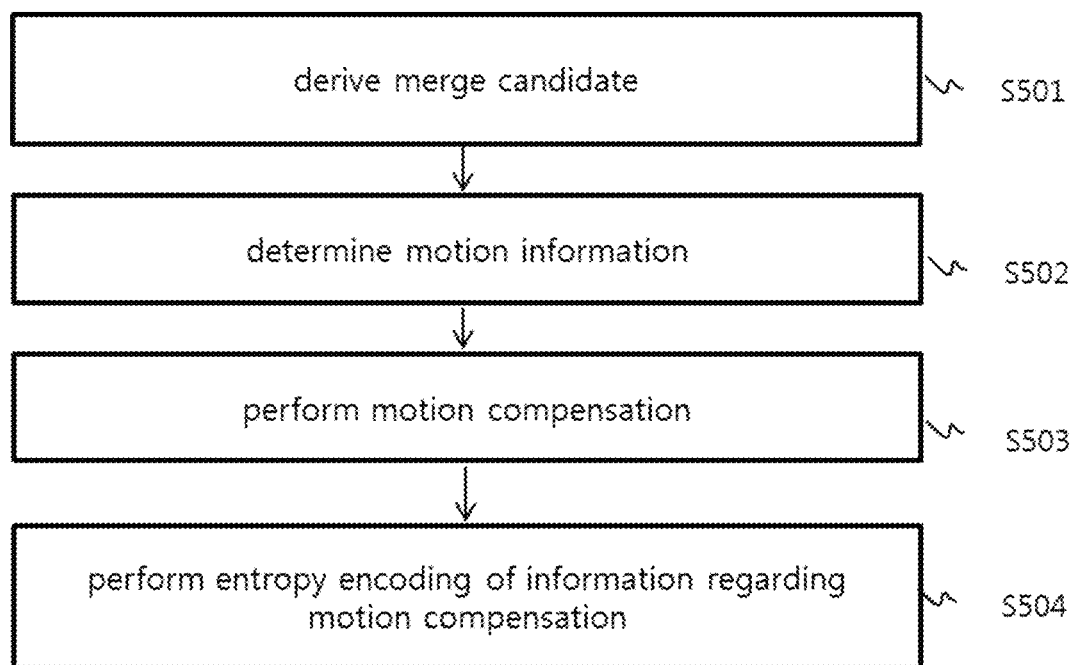
FIG. 5 is a flowchart illustrating an image encoding method using a merge mode, according to the present invention.

In FIG. 4, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Based on the above description, an image encoding method and an image decoding method according to the present invention will be described below.

FIG. 5 is a flowchart illustrating an image encoding method using the merge mode, and FIG. 6 is a flowchart illustrating an image decoding method using the merge mode.

Referring to FIG. 5, an encoding apparatus may derive merge candidates of a current block (S501) and generate a merge candidate list based on the derived merge candidates. When the merge candidate list is generated, motion information of the current block is determined based on the merge candidate list (S502), and motion compensation for the current block may be performed by using the determined motion information (S503). Afterwards, the encoding apparatus may perform entropy encoding on "information regarding the motion compensation" (hereinafter, referred to as "motion compensation information") (S504).

Referring to FIG. 6, a decoding apparatus may perform entropy decoding on the motion compensation information transmitted by the encoding apparatus (S601), derive merge candidates (S602), and generate a merge candidate list based on the derived merge candidates. When the merge candidate list is generated, motion information of the current block is determined based on the generated merge candidate list (S603). Next, the decoding apparatus may perform motion compensation using the motion information (S604).

Hereinbelow, each process step shown in FIGS. 5 and 6 will be described in detail.

First, a process (S501, S502) of deriving merge candidates will be described.

The merge candidates of the current block may include at least one of spatial merge candidates, temporal merge candidates, and other merge candidates.

The spatial merge candidates of the current block may be derived from the reconstructed blocks adjacent to the current block. For example, the motion information of the reconstructed blocks adjacent to the current block may be determined as the spatial merge candidates of the current block. Here, the motion information may include at least one of a motion vector, a reference picture index, and a prediction list utilization flag.

In this case, the motion information of the spatial merge candidates may include not only motion information corresponding to L0 and L1 but also motion information corresponding to L0, L1, . . . , and LX. Here, the X may be zero or a positive integer. Accordingly, as the reference picture list, there may be at least one reference picture list including L0, L1, . . . , and LX.

FIG. 7 is a diagram illustrating an example of a method of deriving the spatial merge candidates and the temporal merge candidates of the current block.

Referring to FIG. 7, the spatial merge candidates of the current block may be derived from the neighboring blocks adjacent to the current block X. The neighboring blocks adjacent to the current block may include at least any one of a block B1 adjacent to the upper end of the current block, a block A1 adjacent to the left end of the current block, a block B0 adjacent to the upper right corner of the current block, a block B2 adjacent to the upper left corner of the current block, and a block A0 adjacent to the lower left corner of the current block.

In order to derive the spatial merge candidates of the current block, it may be determined whether the neighboring blocks adjacent to the current block can be used to derive the spatial merge candidates of the current block. In this case, whether or not the neighboring blocks adjacent to the current block can be used to derive the spatial merge candidates of the current block may be determined according to a predetermined priority. For example, the derivability of the spatial merge candidate from the neighboring block may be determined in the order of the blocks A1, B1, B0, A0, and B2. The spatial merge candidates determined based on the derivability determination order may be sequentially added to the merge candidate list of the current block.

Next, a method of deriving the temporal merge candidate of the current block will be described.

The temporal merge candidate of the current block may be derived from the reconstructed block included in the co-located picture of the current picture. The term 'co-located picture' may be a picture which has been completely encoded/decoded before the current picture is encoded/decoded, or may be a picture having a different temporal order (i.e., picture order count (POC)) from the current picture.

Meanwhile, the temporal merge candidate of the current block may be derived from one or more blocks within the co-located picture, or a plurality of blocks within the respective co-located pictures.

Information on the co-located picture may be transmitted to the decoder from the encoder, or may be implicitly derived according to the encoding/decoding order by the encoder/decoder. Here, information on the co-located picture may be at least any one of an inter-picture prediction indicator, a reference picture index, and motion vector information.

Deriving the temporal merge candidate may mean a process of deriving temporal merge candidate information from the co-located block within the co-located picture and adding the derived temporal merge candidate information to the merge candidate list of the current block. The temporal merge candidate information may include at least any one of a motion vector, a reference picture index, and an inter-picture prediction indicator or a picture order count (POC).

Referring to FIG. 7, in the collocated picture of the current picture, the temporal merge candidate of current block may be derived from a block including a region disposed outside a block located spatially at the same position as the current block X, or a block including a region disposed inside the block located spatially at the same position as the current block X. Here, the temporal merge candidate may mean the motion information of the co-located block. For example, the temporal merge candidate of the current block X may be derived from a block H adjacent to the lower left corner of the block C located spatially at the same position as the current block, or from a block C3 including a center point of the block C. The block H or the block C3 used to derive the temporal merge candidate of the current block may be referred to as 'co-located block' or 'collocated block'.

Meanwhile, the current block or the co-located block of the current block may have a square form or a non-square form.

When the temporal merge candidate of the current block is derived from the block H including a region disposed outside the block C, the block H may be set as the co-located block of the current block. In this case, the temporal merge candidate of the current block may be derived based on the motion information of the block H. On the other hand, when the temporal merge candidate of the current block cannot be derived from the block H, the block C3 including a region disposed inside the block C may be set as the co-located block of the current block. In this case, the temporal merge candidate of the current block may be derived based on the motion information of the block C3. When the temporal merge candidate of the current block can be derived from neither the block H nor the block C3 (for example, when both of the block H and the block C3 are intra-encoded blocks), the temporal merge candidate of the current block may not be derived at all, or may be derived from a position other than the block H and the block C3.

Alternatively, the temporal merge candidate of the current block may be derived from a plurality of blocks within the co-located picture. For example, multiple temporal merge candidates of the current block may be derived from both of the block H and the block C3.

Further alternatively, the temporal merge candidate of the current block may be derived from the co-located block corresponding to a position which is moved from the position of the current block X according to arbitrary motion information of the current block X. The arbitrary motion information may be derived from the motion information of the neighboring block that has been already encoded or decoded.

The co-located block may mean a block located at a predetermined position within a picture (co-located picture) used to derive the motion information of the current block. The predetermined position may be at least one of the same position as the current block, a position adjacent to the current block, and a position within a predetermined distance from the current block, within the co-located picture. The predetermined distance may be a fixed distance preset in the encoder/decoder, or may be a distance derived based on a predetermined vector component (including at least one of the x component and the y component).

The co-located block of the current block may be partitioned into sub-blocks. In this case, the encoder/decoder may determine motion information of any one sub-block among the sub-blocks of the co-located block of the current block as the temporal merge candidate of the current block. In addition, the encoder/decoder may determine the temporal merge candidate of the current block based on at least one piece of the motion information of the sub-blocks of the co-located block of the current block. The sub-block may mean a block having a smaller size, shape, or depth than the current block.

Figure 9:
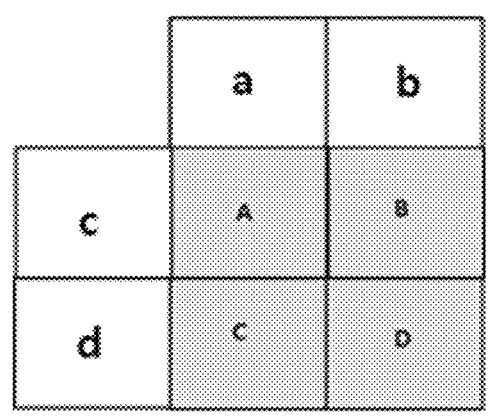
FIG. 9 is a diagram illustrating an embodiment of a method of performing motion compensation in the units of a sub-block.

For example, when a block is partitioned into sub-blocks and at least one temporal merge candidate is derived in the units of a sub-block, the encoder/decoder may derive the temporal merge candidate from the sub-block having a smaller size, shape, or depth than the co-located block corresponding to the position of the block H or the block C3 of FIG. 9.

Alternatively, for example, the encoder/decoder may derive at least one temporal merge candidate from motion information of each sub-block of the co-located block corresponding to a position moved from the current block X according to arbitrary motion information.

Even in this case, the encoder/decoder may determine the temporal merge candidate of the current block by determining whether or not the motion information of the sub-block of the co-located block exists or whether or not the motion information of the sub-block of the co-located block can be used as the temporal merge candidate of the current block.

For example, when the current block is partitioned into sub-blocks and the temporal motion information of the current block is derived in the units of a co-located sub-block within the co-located picture, and when the co-located block is partitioned into sub-blocks and the co-located sub-block located at the center (C3 of FIG. 7) of the co-located block is inter-encoded, temporal motion information may be derived in the units of a co-located sub-block. In this case, when a co-located sub-block derived from an arbitrary position is encoded through the intra-picture prediction, the motion vector of the co-located sub-block located at the center may be reused as the motion information of the co-located sub-block.

Alternatively, for example, when the current block is partitioned into sub-blocks and the temporal motion information is derived in the units of a co-located sub-block within the co-located picture, and when the co-located sub-block located at the position H of FIG. 7 is inter-encoded, the temporal motion information may be derived in the units of a co-located sub-block. In this case, when a co-located sub-block derived from an arbitrary position is intra-encoded, the motion vector of the co-located sub-block derived from the position H of FIG. 7 may be reused as the motion information of the co-located sub-block.

Further alternatively, for example, when the current block is partitioned into sub-blocks and the temporal motion information is derived in the units of a co-located sub-block within the co-located picture, when a co-located sub-block located at the position H of FIG. 7 is inter-encoded, when a co-located sub-block located at the center (C3 of FIG. 3) of the co-located block is inter-encoded, the temporal motion information may be derived in the units of a co-located sub-block. In this case, when a co-located sub-block derived from an arbitrary position is intra-encoded, the motion vector of the co-located sub-block located at the center may be reused as the motion information of the co-located sub-block.

Yet further alternatively, for example, when the current block is partitioned into sub-blocks and temporal motion information is derived in the units of a co-located sub-block within the co-located picture, when a co-located sub-block located at the center C3 of FIG. 7 is intra-encoded, when a co-located sub-block located at the position H of FIG. 7 within the co-located block is inter-encoded, temporal motion information may be derived in the units of a co-located sub-block. In this case, when a co-located sub-block derived from an arbitrary position is intra-encoded, the motion vector of the co-located sub-block located at the position H of FIG. 7 may be reused as the motion information of the co-located sub-block.

The encoder/decoder may determine at least any one of a median value, a mean value, a minimum value, a maximum value, a weighted mean value, and a mode value of the motion information (for example, motion vector) of at least one sub-block of the sub-blocks of the co-located block, as the temporal merge candidate of the current block.

FIG. 7 illustrates an example in which the temporal merge candidate of the current block is derived from the block adjacent to the lower left corner of the co-located block or the block including a center point of the co-located block. However, the position of the block from which the temporal merge candidate of the current block is derived is not limited to the example of FIG. 7. For example, the temporal merge candidate of the current block may be derived from a block adjacent to the upper boundary, the lower boundary, the left boundary, the right boundary, or one of the corners of the co-located block, or a block including a specific position inside the co-located block (i.e., a block adjacent to a corner of the co-located block).

The temporal merge candidate of the current block may be determined in consideration of the current block and the reference picture list (or prediction direction) of the co-located block. On the other hand, the motion information of the temporal merge candidate may include not only motion information corresponding to L0 and L1 but also motion information corresponding to L0, L1, . . . , and LX. Here, the X may be 0 or a positive integer.

In addition, at least one of the temporal merge candidate, the co-located picture, the co-located block, the prediction list utilization flag, and the reference picture index may be derived based on at least one of the coding parameters of the current block, the neighboring block, or the co-located block.

The temporal merge candidate may be preliminarily derived when the number of derived spatial merge candidates is less than the maximum number of merge candidates. Accordingly, when the number of derived spatial merge candidates reaches the maximum number of the merge candidates, the process of deriving the temporal merge candidate may be omitted.

For example, when the maximum number of the merge candidates maxNumMergeCand is two and when the two derived spatial merge candidates have different values, the process of deriving the temporal merge candidate may be omitted.

On the other hand, at least one temporal merge candidate may be necessarily included among the maximum number of merge candidates maxNumMergeCand. In this case, in order for at least one temporal merge candidate exists among the merge candidates, at least one derived spatial merge candidate may be eliminated or a plurality of spatial merge candidates may be combined to reduce the number of spatial merge candidates. In this case, the spatial merge candidates may be combined by calculating a mean value, a maximum value, a minimum value, a median value, a weighted value, or a mode value of the motion information of each spatial merge candidate having an identical inter-picture prediction indicator and/or an identical reference picture.

Alternatively, the encoder/decoder may change the maximum number of merge candidates so that at least one temporal merge candidate can be necessarily included among the maximum number of merge candidates.

Alternatively, for example, the temporal merge candidates of the current block may be derived based on the maximum number of temporal merge candidates. Here, the maximum number of temporal merge candidates may be set such that the maximum number of temporal merge candidates used in the encoding apparatus is equal to the maximum number of temporal merge candidates used in the decoding apparatus. Alternatively, information indicating the maximum number of temporal merge candidates of the current block may be encoded to generate a bitstream, and the bitstream may be signaled to the decoder. For example, the encoder may encode the maxNumTemporalMergeCand indicating the maximum number of temporal merge candidates of the current block, and the encoded maxNumTemporalMergeCand may be signaled to the decoding apparatus as the bitstream. In this case, the maxNumTemporalMergeCand may be set to 0 or a positive integer. For example, the maxNumTemporalMergeCand may be set to 1. The maxNumTemporalMergeCand may be a variable value derived based on the information regarding the number of temporal merge candidates, which is signaled, or may be a fixed value which is preset in the encoder/decoder.

The encoder/decoder may perform a redundancy check to determine whether a newly derived merge candidate has motion information different from that of the merge candidates that are listed in the merge candidate list and may add the newly derived merge candidate to the merge candidate list only when the newly derived merge candidate has different motion information from the merge candidates previously listed in the merge candidate list.

When a distance between the current picture including the current block and the reference picture of the current block is different from a distance between the co-located picture including the co-located block and the reference picture of the co-located block, the motion vector of the temporal merge candidate of the current block may be acquired by scaling the motion vector of the co-located block.

In addition, even when the reference picture for an inter-picture prediction of the picture including the current block is different form the reference picture for an inter-picture prediction of the picture including the co-located block, the motion vector of the temporal merge candidate of the current block may be acquired by scaling the motion vector of the co-located block.

Here, the scaling may be performed based on at least one of a distance between the current picture and the reference picture to which the current block refers and a distance between the co-located picture and the reference picture to which the co-located block refers. For example, the motion vector of the temporal merge candidate of the current block may be derived by scaling the motion vector of the co-located block in accordance with a ratio of the distance between the current picture and the reference picture to which the current block refers and the distance between the co-located picture and the reference picture to which the co-located block refers.

Figure 8:
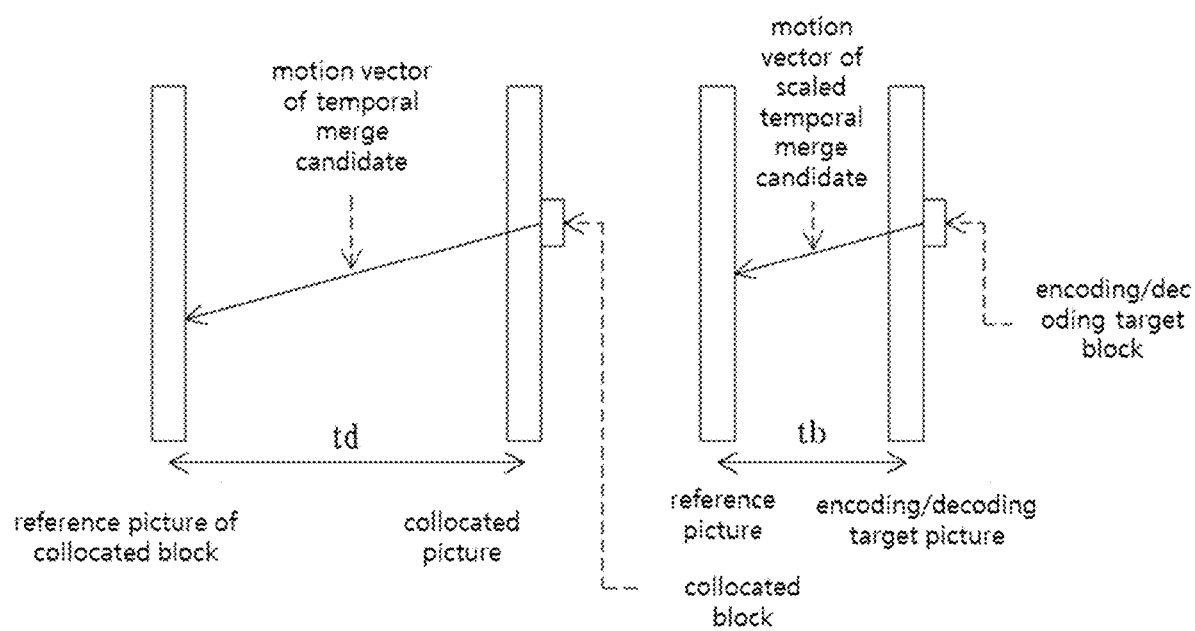
FIG. 8 is a diagram illustrating an example of a method of scaling a motion vector of a co-located block of a current block to derive temporal merge candidates of the current block, according to the present invention.

FIG. 8 illustrates an example of a process of scaling the motion vector that is an item within the motion information of the co-located block to derive the temporal merge candidate of the current block.

The motion vector of the co-located block may be scaled based on a picture order count (POC) difference value td between a POC of the co-located picture and a POC of the reference picture of the co-located block and/or on a POC difference tb between a POC of the current picture and a POC of the reference picture of the current block, wherein the picture order count indicates the display order of pictures.

Before performing the scaling, the td and the tb may be adjusted such that each of the tb and the td falls within a predetermined range. For example, when the predetermined range is −128 to 127, if the td or the tb is less than −128, the td or the tb may be adjusted to be −128. If the td or the tb is greater than 127, the td or the tb may be adjusted to be 127. When the td or the tb is within a range of −128 to 127, the td or the tb may not be adjusted.

A scaling factor DistScaleFactor may be calculated based on the td or the tb. The scaling factor may be calculated based on Equation 1.

$$DistScaleFactor=(tb*x+32)\geq 6$$

$$tx(16384+Abs(td/2)/td \qquad \text{[Equation 1]}$$

In Equation 1, Abs( ) represents an absolute value function, and the function produces absolute values as output values.

The value of the scaling factor DistScaleFactor calculated based on Equation 1 may be adjusted to fall within a predetermined range. For example, the scaling factor DistScaleFactor may be adjusted to fall within a range of −1024 to 1023.

The motion vector of the temporal merge candidate of the current block may be determined by scaling the motion vector of the co-located block by using the scaling factor. For example, the motion vector of the temporal merge candidate of the current block may be determined by Equation 2.

$$\text{Sign}(DistScaleFacor*mvCol)*((Abs(DiusScalekFactor*mvCol)+127)\geq 8) \qquad \text{[Equation 2]}$$

In Equation 2, Sign ( ) represents a function that outputs symbol information of a value disposed in brackets ( ). For example, Sign (−1) outputs a symbol '−'. In Equation 2, mvCol may mean a motion vector of a co-located block.

According to the method described above, the motion vector that is scaled to fit an arbitrary reference picture of the current block is used as the motion vector of the temporal merge candidate of the current block. Alternatively, a motion vector is scaled to fit the temporal merge candidate of the current block by using scaling information of at least one block among the previously encoded/decoded neighboring blocks, and is then modified at least one time, and the modified motion vector may be used as the motion vector of the temporal merge candidate of the current block.

Next, a method of deriving an additional merge candidate of the current block will be described.

The additional merge candidate may mean at least one of a modified spatial merge candidate, a modified temporal merge candidate, a combined merge candidate, and a merge candidate having a predetermined motion information value. Here, the deriving an additional merge candidate means a process of deriving a merge candidate and adding the derived merge candidate to the merge candidate list.

The modified spatial merge candidate may mean a merge candidate generated by changing the motion information of at least one of the derived spatial merge candidates.

The modified temporal merge candidate may mean a merge candidate generated by changing the motion information of at least one of the derived temporal merge candidates.

The combined merge candidate may mean a merge candidate derived by combining the motion information of at least one of a spatial merge candidate, a temporal merge candidate, a modified spatial merge candidate, a modified temporal merge candidate, a combined merge candidate, and a merge candidate having a predetermined motion information value, which are all listed in the merge candidate list. Alternatively, the combined merge candidate may mean a merge candidate derived by combining the motion information of merge candidates that are not listed in the merge candidate list, in which the merge candidates that are not listed in the merge candidate list may include a derived temporal merge candidate and a derive spatial merge candidate which are derived from a block from which at least one temporal or spatial merge candidate can be derived, and include a modified spatial merge candidate, a modified temporal merge candidate, a combined merge candidate, and a merge candidate having a predetermined motion information value, which are generated based on the derived temporal merge candidate and the derived spatial merge candidate.

Meanwhile, the merge candidate having a predetermined motion information value may mean a zero merge candidate having a motion vector of (0, 0).

The zero merge candidate may mean a merge candidate having a motion vector is (0, 0) in at least one motion information type among L0 motion information, L1 motion information, L2 motion information, and L3 motion information.

Alternatively, the zero merge candidate may be at least one type of the two different types. First, the zero merge candidate may be a merge candidate having a motion vector of (0, 0) and a reference picture index having a value of 0 or greater. Second, the zero merge candidate may be a merge candidate having a motion vector of (0, 0) and a reference picture index having a value of only 0.

Next, a process (S502, S603) of determining motion information of the current block by using the generated merge candidate list will be described in detail.

The encoder may determine a merge candidate to be used for motion compensation of the current block among the merge candidates within the merge candidate list by using motion estimation, and may encode a merge candidate index (merge_idx) indicating the determined merge candidate so that the encoded merge candidate index is included in the bitstream.

In addition, the encoder may select a merge candidate from the merge candidate list, based on the merge candidate index, to generate a prediction block and may determine the motion information of the current block. The encoder may perform motion compensation based on the determined motion information and generate a prediction block of the current block.

For example, when a merge candidate index of 3 is selected, a merge candidate that is presented in the merge candidate list and is indexed as the merge candidate index "3" may be determined as the motion information, and the determined merge candidate may be used for motion compensation of an encoding target block (i.e., current block).

The decoder may decode the merge candidate index included in the bitstream and then determine a merge candidate indicated by the merge candidate index, among merge candidates in the merge candidate list. The determined merge candidate may be determined as motion information of the current block. The determined motion information may be used for motion compensation of the current block. Here, the motion compensation may have the same meaning as the inter-picture prediction.

For example, when the merge candidate index is 2, a merge candidate that is present in the merge candidate list and is indexed as the merge candidate index "2" may be determined as motion information, and the determined merge candidate may be used for motion compensation of a decoding target block.

In addition, the value(s) of at least one item of the information corresponding to the motion information of the current block may be modified, and the modified value(s) may be used as the motion information for inter-picture prediction or motion compensation of the current block. The information item whose value is modified is at least any one among the x component of the motion vector, the y component of the motion vector, and the reference picture index.

Next, a process (S503, S604) of performing motion compensation on a current block by using motion information will be described in detail.

The encoder and the decoder may perform inter-picture prediction or motion compensation on the current block by using the motion information of the determined merge candidate. Here, the current block (encoding or decoding target block) may have motion information of the determined merge candidate.

The current block may have a variable number (ranging from 1 to N) of motion information items, depending on the prediction direction. Therefore, it is possible to generate 1 to N prediction blocks for the current block by using the motion information items. Then, a final prediction block of the current block may be determined among the 1 to N prediction blocks.

For example, when the current block has one motion information item, one prediction block can be generated based on the motion information item, and the generated prediction block may be determined as a final prediction block of the current block.

Meanwhile, when the current block has a plurality of motion information items, a plurality of prediction blocks can be generated based on the plurality of motion information items, and a final prediction block of the current block may be determined based on the weighted sum of the plurality of generated prediction blocks. Reference pictures including the respective prediction blocks respectively indicated by the plurality of motion information items may be included in different reference picture lists, or in one reference picture list. When the current block has a plurality of motion information items, the plurality of reference pictures within the plurality of motion information items may be a same reference picture.

For example, a plurality of prediction blocks is generated based on at least one of the spatial merge candidates, the temporal merge candidates, the modified spatial merge candidates, the modified temporal merge candidates, the merge candidates having a predetermined motion information value, the combined merge candidates, and the additional merge candidates, and a final prediction block of the current block may be determined based on the weighted sum of the generated prediction blocks.

Alternatively, for example, a plurality of prediction blocks may be generated based on merge candidates indicated by preset merge candidate indexes, and a final prediction block of the current block may be determined based on the weighted sum of the generated prediction blocks. Further alternatively, for example, a plurality of prediction blocks may be generated based on merge candidates indicated by a predetermined range of merge candidate indexes, and a final prediction block of the current block may be determined based on the weighted sum of the generated prediction blocks.

A weighted value applied to each prediction block may be 1/N (here, N is the number of generated prediction blocks). That is, an equal weighted value may be applied to all of the prediction blocks. For example, when two prediction blocks are generated, the weighted values of the two prediction blocks may be equally ½. When three prediction blocks are generated, the weighted values of the three prediction blocks may be equally ⅓. When four prediction blocks are generated, the weighted values of the four prediction blocks may be equally ¼. Alternatively, a final prediction block of the current block may be determined by applying different weighted values to prediction blocks.

The weighted values of the generated prediction blocks may not be fixed but be variable. Here, the weighted values applied to the respective prediction blocks may be equal or different. For example, when two prediction blocks are generated, the weighted values applied to the two prediction blocks may be respectively ½ and ½, or ⅓ and ⅔, or ¼ and ¾, or ⅖ and ⅗, or ⅜ and ⅝, or the like. That is, the weighted values applied to the generated prediction blocks may be different. The weighted values may be a positive real number or a negative real number. The weighted values applied to the prediction blocks may include a negative real number. For example, the weighted values applied to two prediction values may be respectively −½ and ³⁄₂, or −⅓ and ⁴⁄₃, or −¼ and ⁵⁄₄, or the like.

In order to apply non-uniform weighted values to prediction blocks, one or more pieces of weighted value information may be signaled as a bitstream. The weighted value information may be signaled for each prediction block or for each reference picture. Alternatively, a plurality of prediction blocks may share one piece of weighted value information.

The encoder and the decoder may determine whether to use motion information of a merge candidate based on a prediction block list utilization flag. For example, for each reference picture list, when the prediction block list utilization flag thereof indicates a first value (for example, 1), the flag may mean that the encoder and the decoder can use the motion information of the merge candidate of the current block to perform inter-picture prediction or motion compensation. Meanwhile, for example, when the prediction block list utilization flag indicates a second value (for example, 0), the flag may mean that the encoder and the decoder does not perform inter-picture prediction or motion compensation by using the motion information of the merge candidate of the current block. In regards to settings of the values of the prediction block list utilization flag, the first value may be set to zero 0 and the second value may be set to 1.

Equation 3 to Equation 5 described below respectively refer to the case where the inter-picture prediction indicator of the current block is PRED_BI (i.e., case where two pieces of motion information can be used for the current block), the case where the inter-picture prediction indicator of the current block is PRED_TRI (i.e., case where three pieces of motion information can be used for the current block), and the case where the inter-picture prediction indicator of the current block is PRED_QUAD (i.e., case where four pieces of motion information can be used for the current block). Equations 3 to 5 show examples of a method of generating a final prediction block of a current block in the case where a prediction direction for each reference picture list is one direction.

$$P\_BI = (WF\_L0*P\_L0 + OFFSET\_L0 + WF\_L1*P\_L1 + OFFSET\_L1 + RF) \geq 1 \quad \text{[Equation 3]}$$

$$P\_TRI = (WF\_L0*P\_L0 + OFFSET\_L0 + WF\_L1*P\_L1 + OFFSET\_L1 + WVF\_L2*P\_L2 + OFFSET\_L2 + RF)/3 \quad \text{[Equation 4]}$$

$$P\_QUAD = (WF\_L0 + P\_L0 + OFFSET\_L0\_30WF\_L1*P\_L1 + OFFSET\_L1 + WF\_L2*P\_L2 + OFFSET\_L2 + RF) \geq 2 \quad \text{[Equation 5]}$$

In Equations 3 to 5, each of P_BI, P_TRI, and P_QUAD indicates a final prediction block of a current block, and LX (X=0, 1, 2, 3) means a reference picture list. WF_LX indicates a weighted value of a prediction block generated by using the reference picture list LX, and OFFSET_LX indicates an offset value of a prediction block generated by using the LX reference picture list. P_LX means a prediction block generated by using the motion information of the LX reference picture list of the current block. RF means a rounding factor and may be set to 0, a positive integer, or a negative integer. The LX reference picture list may include at least one of a long-term reference picture, a reference picture to which a deblocking filter is not applied, a reference picture to which an sample adaptive offset is not applied, a reference picture to which an adaptive loop filter is not applied, a reference picture to which only the deblocking filter and the adaptive offset are applied, a reference picture to which only the deblocking filter and the adaptive loop filter are applied, a reference picture to which only the sample adaptive offset and the adaptive loop filter are applied, and a reference picture to which all of the deblocking filter, the sample adaptive offset, and the adaptive loop filter are applied. In this case, The LX reference picture list may be at least any one of the L0 reference picture list, the L1 reference picture list, the L2 reference picture list, and the L3 reference picture list.

Even when the number of prediction directions for a predetermined reference picture list is in plural, a final prediction block of the current block may be acquired based on the weighted sum of the prediction blocks. In this case, the weighted values applied to the prediction blocks derived from one reference picture list may be identical to each other or may be different from each other.

At least one of the weighted value WF_LX and the offset value OFFSET_LX for each of the plurality of prediction blocks may be a coding parameter that is to be entropy-encoded or entropy-decoded.

Alternatively, for example, the weighted value and the offset value of each prediction unit may be derived from the previously encoded/decoded neighboring blocks adjacent to the current block. Here, the neighboring blocks of the current block may include at least one block selected among the blocks used to derive the spatial merge candidates of the current block and the blocks used to derive the temporal merge candidates of the current block.

Further alternatively, for example, the weighted values and the offset values may be determined based on the display order (i.e., picture order count (POC)) of the current picture and on the display order (POC) of each reference picture. In this case, as the larger the distance between the current picture and the reference picture, the smaller the weighted value or the offset value. Conversely, the smaller the distance between the current picture and the reference picture, the larger the weighted value or the offset value. For example, when a POC difference between the current picture and the L0 reference picture is 2, the weighted value applied to the prediction block generated with reference to the L0 reference picture is set to ⅓. Meanwhile, when the POC difference between the current picture and the L0 reference picture is 1, the weighted value applied to the prediction block generated with reference to the L0 reference picture may be set to ⅔. As described above, the weighted value or the offset value may be in inverse proportion to the POC difference between the current picture and the reference picture. Alternatively, the weighted value or the offset value may be set to be in proportion to the POC difference between the current picture and the reference picture.

Yet further alternatively, for example, at least one of the weighted value and the offset value may be entropy-encoded or entropy-decoded based on at least of the coding parameters of the current block, the neighboring block, or the co-located block. The weighted sum of the prediction blocks may be calculated based on at least one of the coding parameters of the current block, the neighboring block, or the co-located block.

The weighted sum of the plurality of prediction blocks may be applied only to at least a partial region of each prediction block. Here, the partial region may be a boundary region of the prediction block. To apply the weighted sum only to a partial region, the weighted sum may be calculated in the units of a sub-block of the prediction block.

When the weighted sum of the prediction blocks is calculated using the merge mode, the weighted sum may be calculated using at least one of the merge candidates within the merge candidate list, and may be used as a final prediction block of an encoding/decoding target block.

For example, the prediction blocks may be generated by using only the spatial merge candidates, the weighted sum of the prediction blocks may be calculated, and the calculated weighted sum may be used as the final prediction block of the encoding/decoding target block.

For example, the prediction blocks may be generated by using both the spatial merge candidates and the temporal merge candidates, the weighted sum of the prediction blocks may be calculated, and the calculated weighted sum may be used as the final prediction block of the encoding/decoding target block.

For example, the prediction blocks may be generated by using only the combined merge candidates, the weighted sum of the prediction blocks may be calculated, and the calculated weighted sum may be used as the final prediction block of the encoding/decoding target block.

For example, the prediction blocks may be generated by using only the merge candidates having specific merge candidate indexes, the weighted sum of the prediction blocks may be calculated, and the calculated weighted sum may be used as the final prediction block of the encoding/decoding target block.

For example, the prediction blocks may be generated by using only the merge candidates indicated by a predetermined range of merge candidate indexes, the weighted sum of the prediction block may be calculated, and the calculated weighted sum may be used as the final prediction block of the encoding/decoding target block.

FIG. 9 is a diagram illustrating an embodiment of a method of performing motion compensation in the units of a sub-block.

Referring to FIG. 9, a current block may be partitioned into four sub-blocks A, B, C, and D, and motion compensation may be performed in the units of a sub-block by using motion information of at least one of the spatial neighboring blocks (or at least one of the sub-blocks of the spatial neighboring blocks) or of at least one of the co-located blocks (or at least one of the sub-blocks of the co-located blocks). Here, the motion information may include at least one of a motion vector, an inter-picture prediction indicator, a reference picture index, and a picture order count (POC).

Next, a process (S504, S601) of performing entropy encoding/decoding on "information on motion compensation" (hereinafter, also referred to as motion compensation information) will be described.

The encoding apparatus may perform entropy encoding on motion compensation information, thereby generating a bitstream, and the decoding apparatus may perform entropy decoding on the motion compensation information included in the bitstream. Here, the motion compensation information which has been entropy-encoded/decoded may include at least one of skip mode use/disuse information (cu_skip_flag), merge mode use/disuse information(merge_flag), merge index information (merge_index), an inter-picture prediction indicator (inter_pred_idc), a weighted value (wf_l0, wf_l1, wf_l2, and wf_l3), and a offset value (offset_l0, offset_l1, offset_l2, and offset_l3). The motion compensation information may be entropy-encoded or entropy-decoded in the units of at least one of a CTU, a coding block, and a prediction block.

The skip mode use/disuse information (cu_skip_flag) may indicate that the skip mode is used when the information has a first value set to 1. Meanwhile, the skip mode use/disuse information (cu_skip_flag) may indicate that the skip mode is not used when the information has a second value set to 0. The motion compensation of the current block may be performed using the skip mode, based on the skip mode use/disuse information.

The merge mode use/disuse information (merge_flag) may indicate that the merge mode is used when the information has a first value set to 1 but indicate that the merge mode is not used when the information has a second value set to 0. The motion compensation of the current block using the merge mode may be performed based on the merge mode use/disuse information.

The merge index information (merge_index) may mean information indicating a specific merge candidate included within the merge candidate list.

Alternatively, the merge index information may mean information regarding the merge index.

Further alternatively, the merge index information may indicate a reconstructed neighboring block which is spatially or temporally adjacent to the current block and is used to derive a merge candidate.

Yet further alternatively, the merge index information may indicate motion information of least one merge candidate. For example, when the merge index information has a first value that is set to 0, it may indicate a first merge candidate that is listed as a first entry in the merge candidate list. When the merge index information has a second value that is set to 1, it may indicate a second merge candidate that is listed as a second entry in the merge candidate list. When the merge index information has a third value that is set to 2, it may indicate a third merge candidate that is listed as a third entry in the merge candidate list. Similarly, when the merge index information has a fourth value, a fifth value, . . . , or an N-th value, it may indicate a merge candidate that is listed as a corresponding entry listed in the merge candidate list. Here, the N may be zero (0) or a positive integer.

The motion compensation of the current block may be performed by using the merge mode based on the merge index information.

When the current block is encoded or decoded through the inter-picture prediction, the inter-picture prediction indicator may mean at least either one of the direction of the inter-picture prediction of the current block and the number of prediction directions of the inter-picture prediction of the current block. For example, the inter-picture prediction indicator may indicate uni-direction prediction, bi-direction prediction, tri-direction prediction, quad-direction prediction, or multi-direction prediction. The inter-picture prediction indicator may mean the number of reference pictures used to generate the prediction blocks of the current block. Alternatively, one reference picture may be used for a plurality of prediction directions. In this case, N-direction predictions may be performed using M reference pictures (wherein, the N and M are positive integers (N>M)). The inter-picture prediction indicator may mean the number of prediction blocks used for the inter-picture prediction or motion compensation of the current block.

As described above, depending on the inter-picture prediction indicator, it is possible to determine the number of reference pictures used to generate the prediction directions for the current block, the number of prediction blocks used to perform the inter-picture prediction or motion compensation of the current block, or the number of reference picture lists that can be used by the current block. Here, the N which is the number of reference picture lists is a positive integer such as 1, 2, 3, 4, or greater. For example, the reference picture lists may include L0, L1, L2, and L3. With respect to the current block, motion compensation may be performed by using one or more reference picture lists.

For example, for the current block, at least one prediction block may be generated first by using at least one reference picture list and then motion compensation may then be performed by using the generated at least one prediction block. For example, the motion compensation of the current block may be performed after generating one or more prediction blocks by using the L0 reference picture list. Alternatively, for example, the motion compensation of the current block may be performed after generating one or more prediction blocks by using the L0 and L1 reference picture lists. Further alternatively, for example, the motion compensation may be performed after generating one prediction block, or more than one prediction block, or a maximum number N of prediction blocks (here, N is 3, or an integer equal to or greater than 2) by using the L0, L1, and L2 reference picture lists. Yet further alternatively, for example, the motion compensation of the current block may be performed after generating one prediction block, or more than one prediction block, or a maximum number N of prediction blocks (here, N is 4 or an integer equal to or greater than 2) by using the L0, L1, L2, and L3 reference picture lists.

The reference picture indicator may indicate one direction (PRED_LX), two directions (PRED_BI), three directions (PRED_TRI), four directions (PRED_QUAD), or more directions in accordance with the number of generated prediction blocks of the current block.

For example, when it is assumed that one-direction prediction is performed for each reference picture list, the inter-picture prediction indicator PRED_LX means that one prediction block is generated by using the LX reference picture list (X is an integer such as 0, 1, 2, 3, or greater) and the inter-picture prediction or the motion compensation is performed by using the generated one prediction block. The inter-picture prediction indicator PRED_BI means that two prediction blocks are generated by using at least one reference picture list of the L0, L1, L2, and L3 reference picture lists, and the inter-picture prediction or the motion compensation is performed by using the generated two prediction blocks. The inter-picture prediction indicator PRED_TRI means that three prediction blocks are generated by using at least one reference picture list of the L0, L1, L2, and L3 reference picture lists and the inter-picture prediction or motion compensation is performed by using the generated three prediction blocks. The inter-picture prediction indicator PRED_QUAD means that four prediction blocks are generated by using at least one reference picture of the L0, L1, L2, and L3 reference picture lists and the inter-picture prediction or motion compensation is performed by using the generated four prediction blocks. That is, the number of the prediction blocks used for the inter-picture prediction of the current block may be set as the inter-picture prediction indicator.

When multi-direction prediction is performed for the reference picture lists, the inter-picture prediction indicator PRED_BI may indicate that two-direction prediction is performed for the L0 reference picture list. Meanwhile, the inter-picture prediction indicator PRED_TRI may indicate that three-direction predication is performed for the L0 reference picture list, or that one-direction prediction is performed for the L0 reference picture list and two-direction prediction is performed for the L1 reference picture list, or that two-direction prediction is performed for the L0 reference picture list and one-direction prediction is performed for the L1 reference picture list.

As described above, the inter-picture prediction indicator may mean that 1 to N (N is the number of prediction directions indicated by the inter-picture prediction indicator) prediction blocks are generated by using at least one reference picture list and the motion compensation is performed by using the generated prediction blocks, or may mean that 1 to N prediction blocks are generated by using N reference pictures and the motion compensation of the current block is performed by using the generated prediction blocks.

For example, the inter-picture prediction indicator PRED_TRI may mean that three prediction blocks are generated by using at least one reference picture of the L0, L1, L2, and L3 reference picture lists and the inter-picture prediction or motion compensation of the current block is performed by using the generated three prediction blocks, or may mean that three prediction blocks are generated by using at least three reference picture lists of the L0, L1, L2, and L3 reference picture lists and the inter-picture prediction or motion compensation of the current block is performed by using the generated three prediction blocks. The inter-picture prediction indicator PRED_QUAD may mean that four prediction blocks are generated by using at least one reference picture list of the L0, L1, L2, and L3 reference picture lists and the inter-picture prediction or motion compensation of the current block is performed by using the generated prediction blocks, or may mean that four prediction blocks are generated by using at least four reference picture lists of the L0, L1, L2, and L3 reference picture lists and the inter-picture prediction or motion compensation of the current block is performed by using the generated prediction blocks.

Available prediction directions for the inter-picture prediction may be determined in accordance with the inter-picture prediction indicator, and only a part or all of the available inter-picture prediction directions may be used depending on the size and/or shape of the current block.

The prediction list utilization flag indicates whether or not an interest reference picture list is used for generation of the prediction block(s).

For example, when the prediction list utilization flag has a first value that is set to 1, the interest reference picture list is used for generation of the prediction block. Meanwhile, when the prediction list utilization flag has a second value that is set to 0, the interest reference picture list is not used for generation of the prediction block. The first value and the second value of the prediction list utilization flag may be respectively set to 0 and 1.

That is, when the prediction list utilization flag has the first value, the motion information corresponding to the reference picture list indicated by the prediction list utilization flag may be used to generate the prediction block of the current block.

On the other hand, the prediction list utilization flag may be set based on the inter-picture prediction indicator. For example, when the inter-picture prediction indicator is PRED_LX, PRED_BI, PRED_TRI, or PRED_QUAD, the prediction list utilization flag predFlagLX may be set to the first value (for example, 1). When the inter-picture prediction indicator is PRED_LN (N is a positive integer other than the X), the prediction list utilization flag predFlagLX may be set to the second value (for example, 0).

Conversely, the inter-picture prediction indicator may be set based on the prediction list utilization flag. For example, when the prediction list utilization flags predFlagL0 and predFlagL1 have the first value set to 1, the inter-picture prediction indicator may be set to PRED_BI. For example, when only the prediction list utilization flag predFlagL0 has the first value set to 1, the inter-picture prediction indicator may be set to PRED_L0.

At least one piece of the motion compensation information may be entropy-encoded or entropy-decoded in the units of a CUT or a sub-CTU. The sub-CTU may be a unit including at least one of a CU and a PU. The sub-CTU which is a lower level unit of the CTU may have a square form or a non-square form. The motion compensation information, which will be described below, may mean at least one piece of information regarding motion compensation.

When the motion compensation information is entropy-encoded or entropy-decoded in the units of a CTU, depending on the motion compensation information, the motion compensation may be performed for a part of or all of the blocks existing in one CTU by using the motion compensation information.

When the motion compensation information is entropy-encoded or entropy-decoded in the units of a CTU or a sub-CTU, the motion compensation information may be entropy-encoded or entropy-decoded based on at least one of a predetermined block size and a predetermined block depth.

The motion compensation information may be entropy-encoded or entropy-decoded in the units of a block, or may be entropy-encoded or entropy-decoded in an upper level than the block. For example, the motion compensation information may be entropy-encoded or entropy-decoded in the units of a block (i.e., a CTU, a CU, or a PU), or may be entropy-encoded or entropy-decoded in the units of an upper level unit such as a video parameter set, a sequence parameter set, a picture parameter set, an adaptation parameter set, and a slice header.

The motion compensation information may be entropy-encoded or entropy-decoded based on a motion compensation information difference value that is a difference between a value of the motion compensation information and a prediction value of the motion compensation information. For example, in regards to the inter-picture prediction indicator that is one information item of the motion compensation information which is the information regarding the motion compensation, an inter-picture prediction indicator prediction value (i.e., a prediction value of an inter-picture prediction indicator) and an inter-picture prediction indicator difference value (i.e., a difference between a value of an inter-picture prediction indicator and a prediction value of an inter-picture prediction indicator) may be entropy-encoded or entropy-decoded. In this case, the inter-picture prediction indicator difference value may be entropy-encoded or entropy-decoded in the units of a block, and the inter-picture prediction indicator prediction value may be entropy-encoded or entropy-decoded in an upper level. When a motion compensation information prediction value, such as the inter-picture prediction indicator prediction value, is entropy-encoded or entropy-decoded in the units of a picture or slice, a same motion compensation information prediction value may be used for all of the blocks included in one picture or one slice.

The motion compensation information prediction value may be derived from a specific region within a picture, slice, or tile, or a specific region within a CTU or CU. For example, an inter-picture prediction indicator of a specific region within a picture, a slice, a tile, a CTU, or a CU may be used as an inter-picture prediction indicator prediction value thereof. In this case, entropy encoding/decoding of the motion compensation information prediction value may not be performed, but only the motion compensation information difference value may be entropy-encoded or entropy-decoded.

Alternatively, the motion compensation information prediction value may be derived from the encoded/decoded neighboring blocks of the current block. For example, an inter-picture prediction indicator of one encoded/decoded neighboring block of the current block may be used as the inter-picture prediction indicator prediction value of the current block. Here, the neighboring block of the current block may mean at least one block of the blocks used to derive the spatial merge candidates and the temporal merge candidates. The neighboring block may have a depth the same as or shallower than the depth of the current block. When there are multiple neighboring blocks, one neighboring block is selectively used in accordance with a predetermined selection order. The neighboring block of the current block, used to predict the motion compensation information, may be a block located at a fixed position or a block located at a variable position that varies according to the position of the current block. Here, the position of the current block may be a position within a picture or slice to which the current belongs, or a position within a CTU, CU, or PU to which the current block belongs.

The merge index information may be calculated by using index information within predetermined information sets that are predefined in the encoder and the decoder.

When the motion compensation information prediction value and the motion compensation information difference value are used, the decoding apparatus may calculate a value of motion compensation information of a prediction block by adding the motion compensation information prediction value and the motion compensation information difference value.

The motion compensation information or the motion compensation information difference value may be entropy-encoded or entropy-decoded based on at least one of the coding parameters of the current block, the neighboring block, or the co-located block.

The motion compensation information, the motion compensation information prediction value, or the motion compensation information difference value obtained based on at least one of the coding parameters of the current block, the neighboring block, or the co-located block may be derived as the motion compensation information, the motion compensation information prediction value, or the motion compensation information difference value of the current block.

Instead of performing entropy encoding/decoding on the motion compensation information of the current block, the motion compensation information of one encoded/decoded neighboring block of the current block may be used as the motion compensation information of the current block. For example, the inter-picture prediction indicator of the current block may be set to have the same value as that of the inter-picture prediction indicator of one encoded/decoded neighboring block of the current block.

At least one information item of the motion compensation information may have a fixed value preset in the encoder and the decoder. The preset fixed value may be determined as a value of at least one information item of the motion compensation information. In a block in which a plurality of smaller blocks is included, the smaller blocks may share at least one information item of the motion compensation information having the preset fixed value. Similarly, a block includes a plurality of smaller blocks, and each smaller block includes a plurality of further smaller blocks with a deeper depth, the further smaller blocks with a deeper depth may share at least one information item of the motion compensation information having the preset fixed value. Here, the fixed value may be 0, a positive integer, a vector value of (0, 0), or a vector value of integers.

The notion of sharing at least one information item of the motion compensation information means that the smaller blocks within one block may have an equal value for at least one information item of the motion compensation information or may perform motion compensation using the equal value for the at least information item of the motion compensation information.

The motion compensation information (i.e., information on motion compensation) may include at least one of a motion vector, a motion vector candidate, a motion vector candidate index, a motion vector difference value, a motion vector prediction value, skip mode use/disuse information (skip_flag), merge mode use/disuse information (merge_flag), merge index information (merge_index), motion vector resolution information, overlapped block motion compensation information, local illumination compensation information, affine motion compensation information, decoder motion vector derivation information, and bi-directional optical flow information.

The motion vector resolution information may be information indicating whether a specific resolution is used for at least one of the motion vector and the motion vector difference value. Herein, the resolution may mean precision. In addition, the specific resolution may be determined in the units of at least one of an integer pixel (integer-pel), a half pixel (½-pel), a quarter pixel (¼-pel), a one-eighth pixel (⅛-pel), a one-sixteenth pixel (1/16-pel), a one-thirty second pixel (1/32-pel), and a one-sixty fourth pixel (1/64-pel).

The overlapped block motion compensation information may mean information indicating whether the weighted sum of the prediction blocks of the current block is calculated by additionally using the motion vector of the neighboring block spatially adjacent to the current block when performing motion compensation on the current block.

The local illumination compensation information may be information indicating whether or not at least one of the weighted value and the offset value is applied when generating the prediction blocks of the current block. Here, at least one of the weighted value and the offset value may be calculated based on a reference block.

The affine motion compensation information may be information indicating whether or not the affine motion model is used when performing motion compensation on the current block. Here, the affine motion model may be a model in which one block is partitioned into sub-blocks by using a plurality of parameters and a motion vector of each sub-block is calculated by using a representative motion vector.

The decoder motion vector derivation information may be information indicating whether or not a motion vector required for motion compensation is derived and used by the decoder. Depending on the decoder motion vector derivation information, entropy encoding/decoding may not be performed on information regarding the motion vector. When the decoder motion vector derivation information indicates that the motion vector is derived and used by the decoder, the information regarding the merge mode may be entropy-encoded or entropy-decoded. That is, the decoder motion vector derivation information may indicate whether or not the merge mode is used in the decoder.

The bidirectional optical flow information may be information indicating whether or not the motion compensation is performed while the motion vector is modified in the units of a pixel or a sub-block. The motion vector in the units of a pixel or a sub-block may not be entropy-encoded or entropy-decoded, depending on the bidirectional optical flow information. Here, the modification of the motion vector may mean a process of changing the value of the motion vector in the units of a block into the value of the motion vector in the units of a pixel or a sub-block.

The motion compensation of the current block may be performed by using at least one information item of the motion compensation information, and at least one item of the motion compensation information may be entropy-encoded or entropy-decoded.

When the motion compensation information is entropy-encoded or entropy-decoded, any binarization method selected among a truncated rice binarization method, a K-th order exponential Golomb binarization method, a limited K-th order exponential Golomb binarization method, a fixed-length binarization method, a unary binarization method, and a truncated unary binarization method may be used.

When the motion compensation information is entropy-encoded or entropy-decoded, a context model may be determined by using at least one selected among the motion compensation information or the region information of the neighboring block of the current block, the previously encoded/decoded motion compensation information or the previously encoded/decoded region information, the depth information of the current block, and the size information of the current block.

When the motion compensation information is entropy-encoded or entropy-decoded, the entropy encoding or decoding may be performed by using at least one of the motion compensation information of the neighboring block, the previously encoded/decoded motion compensation information, the depth information of the current block, and the size information of the current block, as the prediction value of the motion compensation information of the current block.

Hereinabove, the image encoding and decoding methods using the merge mode have been described with reference to FIGS. 5 to 9. Hereinbelow, a method of deriving a temporal merge candidate will be described with reference to FIG. 10.

The encoder/decoder may derive a temporal merge candidate from at least one block reconstructed by using a reference picture that is temporally adjacent to the current block. Here, the reference picture that is temporally adjacent to the current block may be a co-located picture.

Information on the co-located picture, which is at least one of an inter-picture prediction indicator, a reference picture index, motion vector information, and a picture order count (POC), may be transmitted from the encoder to the decoder, in the units of a sequence, a picture, a slide, a tile, a CTU, a CUT, or a PU.

In addition, the information on the co-located picture may be implicitly derived by the encoder/decoder by using at least one of (1) the hierarchy according to the encoding/decoding order, (2) motion information of the previously encoded/decoded temporal/spatial neighboring blocks, (3) the inter-picture prediction indicator of a corresponding picture in an upper level such as a sequence, a picture, a slice, or a tile, and (4) the reference picture index information.

Here, the derivation of the temporal merge candidate may mean a process of deriving temporal merge candidate information (for example, at least one of a motion vector, a reference picture, an inter-picture prediction indicator, and a picture order count) from the co-located block within the co-located picture and adding the derived temporal merge candidate to the merge candidate list of the current block.

The position of the co-located block means a position that is the same as that of the current block and disposed within the co-located picture. The position of the co-located block may be a position that is moved from the position of the current block based on at least one of the motion vectors of the previously encoded/decoded temporal/spatial neighboring blocks of the current block.

For example, when it is assumed that a picture-level or slice-level co-located picture including the current block is set as a first reference picture in an L1 direction, the spatial neighboring blocks are scanned in arbitrary order to determine whether or not there is L1 direction motion information. When it is determined that there is the L1 direction motion information, the co-located block of the current block may be derived by using the L1 motion information.

Here, the spatial neighboring blocks may be neighboring blocks used to derive the spatial merge candidates of the current block shown in FIG. 7.

Alternatively, for example, when it is assumed that a picture-level (or slice-level) co-located picture including the current block is set as the first reference picture in the L1 direction, the spatial neighboring blocks are scanned in arbitrary order to determine whether or not there is L1 direction motion information. When it is determined that the L1 direction motion information does not exist, the spatial neighboring blocks are scanned in the same way for the L0 direction motion information. Here, when the L0 direction motion information exists, the co-located block of the current block may be derived by using the L0 direction motion information.

Further alternatively, for example, when it is assumed that a picture-level (slice-level) co-located picture current block including the current block is set as the reference picture in the L1 direction, the spatial neighboring blocks are scanned in the order in which the spatial merge candidates are derived. When the L0 direction motion information exists in a block that is firstly found to have motion information, the motion information is mirrored as the L1 direction motion information, so that the co-located picture and the co-located block of the current block are redefined. In this case, the L1 direction motion vector is obtained by performing directional scaling on the L0 direction motion vector, and the same reference picture index may be used or a different reference picture index may be used for the L1 direction. When the same reference picture index as that of the L0 direction is not used for the L1 direction, motion vector scaling according to a temporal-axis distance may be applied.

In order to select a co-located picture of the current block, as a first method, all reference pictures of the current block in the L0 direction and/or the L1 direction are considered as the co-located pictures, then the temporal merge candidates are derived from all of the reference pictures, and finally a reference picture having the least RD cost is selected as the co-located picture. As a second method, a reference picture which has been most frequently selected by the temporal neighboring blocks may be selected as the co-located picture.

When selecting the co-located picture of the current block, one or more co-located pictures may be used for each inter-picture prediction indicator.

For example, a reference picture that is most frequently selected by at least one of the temporal/spatial neighboring blocks for each of the L0 and L1 inter-picture prediction indicators may be selected as the co-located picture of the L0 direction and the L1 direction of the current block. In this case, the temporal merge candidates are derived for each inter-picture prediction indicator to generate prediction blocks for the L0 direction and the L1 direction, and a final prediction block of the current block is determined by using the weighted sum of the prediction blocks (i.e., the mean value of the prediction blocks generated by using the temporal merge candidates in the L0 direction and the L1 direction). When selecting the co-located picture(s) in the L0 direction and/or the L1 direction, at least one or more motion vectors derived from at least one or more temporal/spatial neighboring blocks is/are obtained by using at an arbitrary representative value (i.e., at least one of a minimum value, a maximum value, a mean value, a median value, and a weighted value), and the obtained motion vector may be used to derive the position of the co-located block.

Alternatively, for example, for each of the L0 and L1 inter-picture prediction indicators, at least one or more temporal/spatial neighboring blocks are scanned to find motion information, and the L0 and L1 reference pictures that are firstly selected may be determined as the co-located pictures of the L0 direction and the L1 direction. In this case, the temporal merge candidate for each inter-picture prediction indicator may be derived and then the prediction blocks of the current block in the L0 direction and the L1 direction may be generated. Then, the prediction block of the current block may be generated by using the weighted sum (for example, the mean value of the prediction blocks generated by using the temporal merge candidates in the L0 direction and the L1 direction).

In regards to the scaling a motion vector, which is performed in the process of deriving temporal merge candidates, as illustrated in FIG. 8, the scaling of a motion vector derived from a co-located block may be performed in accordance with a ratio of a POC difference value td between a POC of the co-located block and a POC of the reference picture of the co-located block and a POC difference value tb between a POC of the current block and a POC of the reference picture of the current block.

According to one embodiment of the scaling method, the scaling may be performed by applying a weighted value to the motion vector that is scaled according to the scaling method described above and illustrated in FIG. 8, based on motion vector scaling information that is a relationship between the encoded/decoded temporal/spatial neighboring blocks and the co-located blocks thereof.

Since the motion vector scaling information between the encoded/decoded temporal/spatial neighboring blocks and the co-located blocks thereof is reflected on the scaling process, it is possible to improve the accuracy of the motion vector scaling that is performed during the merge candidate derivation process.

Hereinbelow, the motion vector scaling information between the encoded/decode temporal/spatial neighboring blocks and the co-located blocks corresponding to the encoded/decoded temporal/spatial neighboring blocks will be described with reference to FIG. 10.

Figure 10:
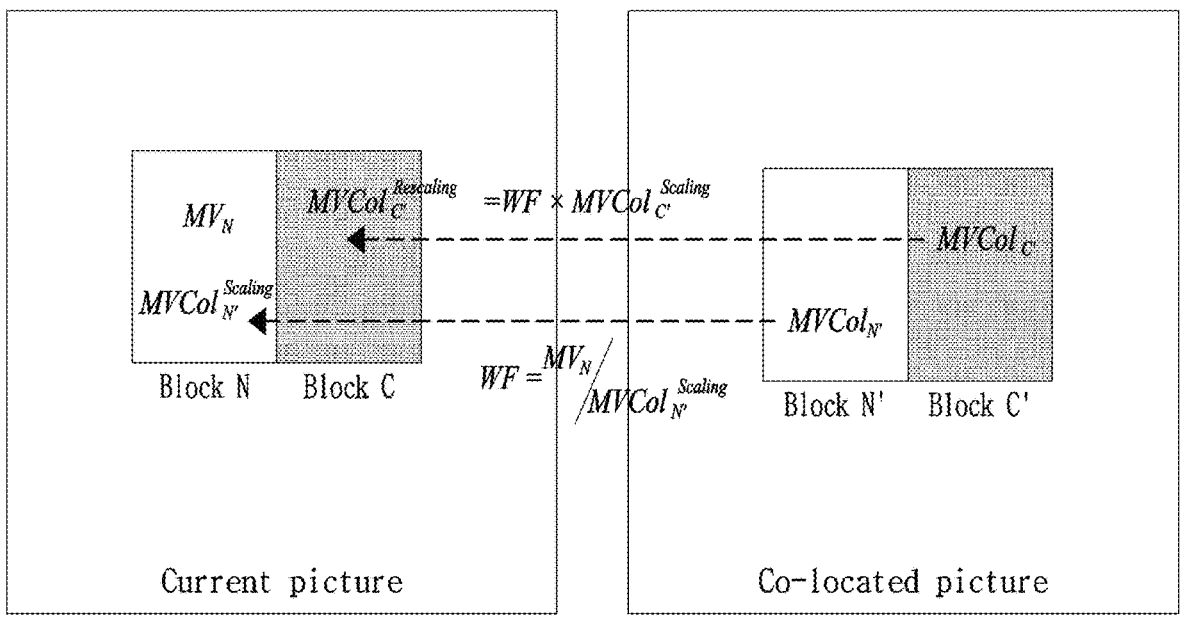
FIG. 10 is a diagram illustrating an example of a method of modifying a scaled motion vector to derive temporal merge candidates, according to the present invention.

In FIG. 10, it is assumed that the current block is a block N, the neighboring block is a block C, the co-located blocks of the current block and the neighboring block are respectively a block N' and a block C', a motion vector obtained by encoding/decoding the block N is MVN, and a motion vector derived from the block N' is MVColN'. In this case, when the motion vector obtained by scaling the MVColN' using the motion vector scaling method described above and illustrated in FIG. 8 is $MVCOL_N^{Scaling}$, the weighted value WF obtained based on the motion vector scaling information between the encoded/decoded temporal/spatial neighboring blocks and the co-located blocks thereof may be derived according to Equation 6.

$$WF = MV_N / MVCol_{N'}^{Scaling} \qquad \text{[Equation 6]}$$

The weighted value WF derived by Equation 6 may be applied to the scaled motion vector that is scaled by using the scaling method of FIG. 8. One embodiment of the motion vector scaling method using the weighted value WF is shown in Equation 7. Here, $MVCol_C^{Scaling}$ may be a motion vector obtained by scaling MVColC' through the motion vector scaling method of FIG. 8.

$$MVCol_C^{Rescaling} = WF \times MVCol_C^{Scaling} \qquad \text{[Equation 7]}$$

Meanwhile, the weighted value WF may be modified when the POC difference value td according to the scaling of the motion vector of the current block is different from the POC difference value td according to the scaling of the motion vector of the temporal/spatial neighboring block.

For example, the weighted value WF may be modified by reflecting the POC difference value td.

Alternatively, for example, the weighted value WF may be modified when the POC difference value tb according to the motion vector of the current block is different from the POC difference value tb according to the motion vector of the temporal/spatial neighboring block.

For example, the weighted value WF may be modified by reflecting the POC difference value tb.

A plurality of weighted values may be used to improve the accuracy of the motion vector scaling which is performed in the process of deriving the temporal merge candidates.

For example, at least one weighted value among the plurality of weighted values derived from the encoded/decoded temporal/spatial neighboring blocks of the current block may be applied to the motion vector scaling. Here, the plurality of weighted values may be derived from the respective temporal/spatial neighboring blocks as illustrated in FIG. 10.

Alternatively, for example, an arbitrary representative value (for example, a mean value, a median value, a maximum value, a minimum value, a mode value, and a weighted mean value) of the plurality of weighted values derived from the encoded/decoded temporal/spatial neighboring blocks of current block may be applied to the motion vector scaling.

In the motion vector scaling method described above and illustrated in FIG. 10, positional information of the neighboring blocks used to derive the weighted values may be explicitly transmitted from the encoder to the decoder, or may be implicitly derived according to the same procedure in the encoder/decoder. The positional information of the neighboring blocks used to derive the weighted values may be information indicating that which neighboring blocks are used to derive the weighted values.

The positional information of the neighboring blocks used to derive the weighted values may be implicitly derived based on the motion information of at least one of the current block, the co-located block of the current block, temporal and spatial neighboring blocks, and co-located blocks of the temporal and spatial neighboring blocks. Here, the motion information used for the derivation of the weighted values may include at least one of an inter-picture prediction indicator, a motion vector, a motion vector difference value, a reference picture index, a motion vector prediction value candidate index, and td and tb defined in FIG. 7.

For example, when a neighboring block satisfying at least one of the conditions described below is firstly found while the neighboring blocks are scanned in the order in which the spatial merge candidates are derived, the weighted value may be derived from the neighboring block. In the following description, a block C, a block C', a block N, and a block N' are the same as those illustrated in FIG. 10 and tb and td are the same as those defined in FIG. 7.

1) When the block C and the block N have an equal tb.
2) When the block C' and the block N' within the co-located picture have an equal td.
3) When the td for the block C and the block N, and the td for the block C' and the block N' within the co-located picture are equal.
4) When the motion vectors of the block C and the block N use a same reference picture.
5) When the motion vectors of the block C' and the block N' within the co-located picture use a sample reference picture.
6) When the motion vector of the block N' in the co-located picture and the motion vector of the block C use a same reference picture.
7) When the motion vector of the block C' in the co-located picture and the motion vector of the block N use a same reference picture.
8) When the motion vectors of the block C and the Block N use a same reference picture and when the reference pictures of the temporal merge candidates of the block C and the block N are the same.
9) When the motion vectors of the block C' and the block N' within the co-located picture use a same reference picture and when the reference pictures of the temporal candidates of the block C and the block N are the same.

Alternatively, for example, when the neighboring blocks are scanned in the order in which the spatial merge candidates are derived and a neighboring block that has been inter-predicted is firstly found, the weighted value may be derived from the firstly found neighboring block.

Hereinabove, the method of scaling a motion vector during the temporal merge candidate derivation process has been described. In the above description, the current block, the temporal and spatial neighboring blocks, and the co-located blocks may be interpreted to include the sub-blocks of the current block, the sub-blocks of the temporal and spatial neighboring blocks, and the sub-blocks of the co-located blocks. Besides the process of deriving the temporal merge candidates, the motion vector scaling method illustrated in FIG. 10 also can be used in the process of deriving the temporal motion vector candidates in the AMVP mode. Here, the method of deriving the temporal motion vector candidates in the AMVP mode may be a process of deriving temporal motion vector prediction values to generate the motion vector prediction value of the current block.

For example, when deriving temporal motion vector prediction values for motion vectors generated after the motion prediction of the current block, to generate a motion vector candidate list that is a candidate list constructed using motion vector prediction values for each of the reference pictures included in the L0 and L1 reference picture lists, the accuracy of the temporal motion vector prediction values of the current block can be improved by using a relationship between the motion vector information of the encoded/decoded neighboring blocks and the temporal motion vector prediction values obtained by scaling the motion vectors derived from the co-located blocks of the neighboring blocks in accordance with the reference pictures of the current block like by using the method described above and illustrated in FIG. 10.

Hereinbelow, a method of reducing a transmission amount of the motion information will be described.

When the motion information generated through the motion prediction method in the encoder is transmitted to the decoder, the amount of the motion information transmitted to the decoder may vary depending on the mode of the inter-picture prediction.

For example, the encoder may transmit the motion information (i.e. at least one of a motion vector, a motion vector difference value, a reference picture index, a motion vector prediction value candidate index, and an inter-picture prediction indicator) to the decoder to perform the inter-picture prediction, or may transmit the merge index information (merge_idx) to the decoder. Here, the merge index information may mean information indicating a merge candidate among merge candidates listed in the merge candidate list as described above.

The encoder may determine, based on the RD cost function, whether to transmit the merge index information (merge_idx) (i.e., to perform the merge mode), or whether to directly transmit the whole motion information (i.e., to perform the skip mode), or whether to transmit a part of the motion information (at least one of a motion vector difference value, a reference picture index, a motion vector prediction value candidate index, and an inter-picture prediction indicator) (i.e., to perform the AMVP mode).

The encoder may determine the motion information to be transmitted to the decoder for each prediction direction of L0, L1, . . . , and Ln directions (wherein n is an integer of 2 or greater) based on the RD cost function.

For example, the encoder may transmit the motion information for the L0 direction of the current block, and may transmit the merge index information for the L1 direction of the current block. Here, when obtaining optimum temporal and spatial merge candidate lists for the L1 direction, a prediction block may be generated by using the L0 direction motion, and a prediction block may be generated for each merge candidate list for the L1 direction. Afterwards, bi-direction prediction blocks are generated by using the weighted sum (for example, the mean value) of the prediction blocks in the L0 and L1 directions, and merge index information that selects a merge candidate with the least RD cost as an optimum merge candidate for the L1 direction may be determined.

Alternatively, for example, the encoder may transit different merge index information to the decoder with respect to the L0 direction and the L1 direction of the current block. In this case, a L0 direction prediction block is generated in a state in which a merge candidate list of the L0 direction is fixed, and then a L1 direction prediction block is generated for each merge candidate list of the L1 direction. Next, bi-direction prediction blocks are generated by using the weighted sum (for example, the mean value) of the generated L0 and L1 prediction blocks, and merge index information that selects a merge candidate with the least RD cost as the merge candidates for the L0 direction and the L1 direction may be determined.

The encoder may transmit both of the motion information and the merge index information for an LX (X is zero or a positive integer) direction to the decoder. In this case, the prediction block of the current block in the LX direction may be generated by using a representative value (for example, one of a median value, a mean value, a minimum value, a maximum value, a weighted value, and a mode value) of the prediction blocks derived respectively by using the motion information of the LX direction and the merge index information.

The encoder may transmit both of the motion information and the merge index information for each of the L0 direction and the L1 direction of the current block to the decoder. In this case, a prediction block of the current block in the L0 direction may be generated by using a representative value (for example, one of a median value, a mean value, a minimum value, a maximum value, a weighted value, and a mode value) of the prediction blocks respectively derived by using the motion information of the L0 direction and the merge index information, and a prediction block of the current block in the L1 direction may be generated by using a representative value (for example, one of a median value, a mean value, a minimum value, a maximum value, a weighted value, and a mode value) of the prediction blocks respectively derived by using the motion information of the L1 direction and the merge index information. The final prediction block of the current block may be generated by using a representative value (for example, one of a median value, a mean value, a minimum value, a maximum value, a weighted value, and a mode value) of the prediction block for the L0 direction and the prediction block for the L1 direction.

In the embodiment described above, the encoder may transmit merge mode use/disuse information (merge_flag) along with merge index information to the decoder.

On the other hand, the encoder according to one embodiment of the present invention may define an inter-picture prediction indicator indicating whether the merge mode is used, and may transmit the inter-picture prediction indicator instead of transmitting the merge mode use/disuse information.

When an inter-picture prediction (bi-prediction) is performed on the current block, the encoder/decoder may determine whether the merge index information is used for each of the L0 and L1 directions or both of the L0 and L1 directions, and may have a binarization symbol value (bin string) unique to each inter-picture prediction indicator.

Here, PRED_L0 may be defined as an inter-picture prediction indicator indicating that motion information derived after L0 direction motion prediction is performed is transmitted to the decoder.

PRED_L1 may be defined as an inter-picture prediction indicator indicating that motion information derived after L1 direction motion prediction is performed is transmitted to the decoder.

PRED_BI may be defined as an inter-picture prediction indicator indicating that motion information derived after motion prediction is performed for each of the L0 direction and the L1 direction is transmitted to the decoder.

PRED_BI_MERGE_L0 may be defined as an inter-picture prediction indicator indicating that: for the L0 direction, merge index information is transmitted to the decoder; and for the L1 direction, motion information derived after motion prediction is performed is transmitted to the decoder.

PRED_BI_MERGE_L1 may be defined as an inter-picture prediction indicator indicating that: for the L1 direction, merge index information is transmitted to the decoder; and for the L0 direction, the motion information derived after motion prediction is performed is transmitted to the decoder.

PRED_BI_MERGE_BI may be defined as an inter-picture prediction indicator indicating that different merge index information is transmitted to the decoder respectively for the L0 direction and the L1 direction.

PRED_BI_MERGE_L0, PRED_BI_MERGE_L1, and PRED_BI_MERGE_BI may be differently defined as described below.

The PRED_BI_MERGE_L0 may be defined as an inter-picture prediction indicator indicating that: merge index information and motion information derived after L0 direction motion prediction is performed are transmitted to the decoder; and for the L1 direction, the motion information derived after motion prediction is performed is transmitted to the decoder. In this case, the prediction block of the L0 direction may be generated by using a representative value (for example, one of a median value, a mean value, a minimum value, a maximum value, a weighted value, and a mode value) of the prediction blocks which are respectively obtained by using the motion information derived after the motion prediction is performed and by using the merge index information.

The PRED_BI_MERGE_L1 may be defined as an inter-picture prediction indicator indicating that: merge index information and motion information derived after L1 direction motion prediction is performed are transmitted to the decoder; and for the L0 direction, the motion information derived after motion prediction is performed is transmitted to the decoder. In this case, the prediction block of the L1 direction may be generated by using a representative value (for example, one of a median value, a mean value, a minimum value, a maximum value, a weighted value, and a mode value) of the prediction blocks which are respectively obtained by using the motion information derived after the motion prediction is performed and by using the merge index information.

The PRED_BI_MERGE_BI may be defined as an inter-picture prediction indicator indicating that for each of the L0 direction and the L1 direction, motion information derived after motion prediction is performed and merge index information are transmitted to the decoder. In this case, the prediction block of the current block in each of the L0 direction and the L1 direction may be generated by using a representative value (for example, one of a median value, a mean value, a minimum value, a maximum value, a weighted value, and a mode value) of the prediction blocks which are respectively obtained by using the motion information and by using the merge index information.

In addition, the encoder/decoder may define other inter-picture prediction indicators described below.

For example, PRED_L0_MERGE may be defined as an inter-picture prediction indicator indicating merge index information for the L1 direction is transmitted to the decoder.

On the other hand, PRED_L0_MERGE may be defined as an inter-picture prediction indicator indicating that merge index information and motion information derived after L0 direction motion prediction is performed to the decoder. A prediction block in the L0 direction may be generated from a representative value (for example, at least any one of a median value, a mean value, a minimum value, a maximum value, a weighted mean value, and a mode) of the prediction blocks obtained respectively by using the merge index information and the motion information derived after the motion prediction is performed.

As another embodiment, PRED_L1_MERGE may be defined as an inter-picture prediction indicator indicating that merge index information for the L1 direction is transmitted to the decoder.

Meanwhile, PRED_L1_MERGE may be defined as an inter-picture prediction indicator indicating that merge index information and motion information derived after L1 direction motion prediction is performed is transmitted to the decoder. Here, a prediction block in the L1 direction may be generated by using a representative value (at least any one of a median value, a mean value, a minimum value, a maximum value, a weighted mean value, and a mode) of the prediction blocks which are obtained respectively by using the merge index information and the motion information derived after the motion prediction is performed.

Hereinabove, the method of reducing a transmission amount of the motion information has been described.

Hereinbelow, an image encoding method and an image decoding method according to one embodiment of the present invention will be described with reference to FIGS. 11 to 14.

Figure 11:
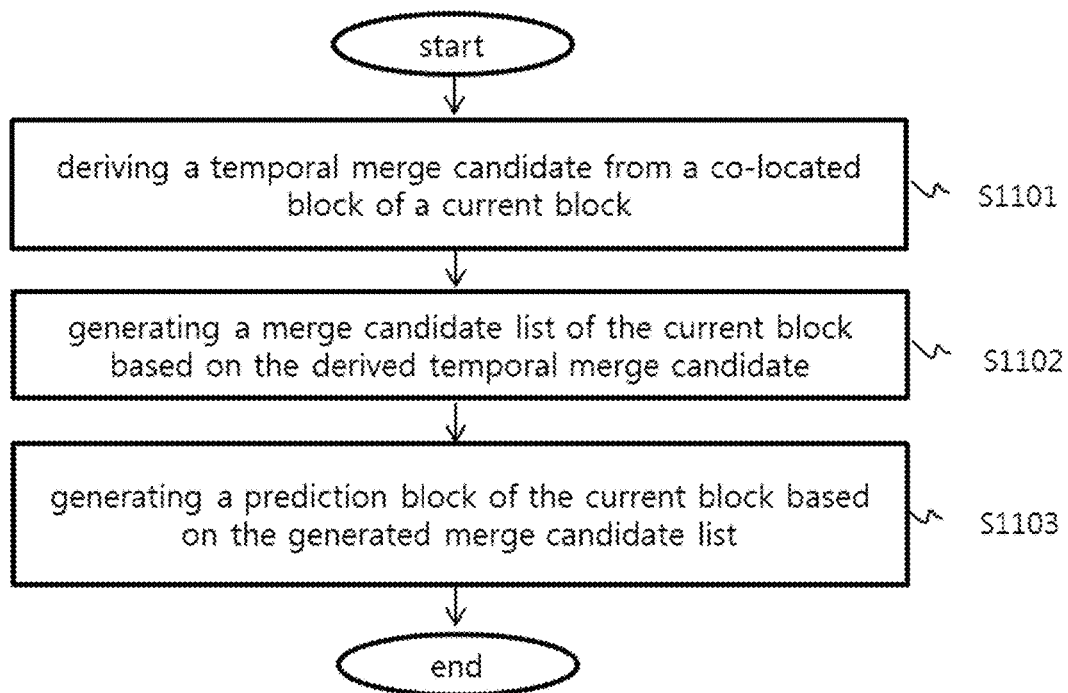
FIG. 11 is a flowchart illustrating an image decoding method according to the present invention.

FIG. 11 is a diagram illustrating an image decoding method according to one embodiment of the present invention.

Referring to FIG. 11, the decoder may derive the temporal merge candidate from the co-located block of the current block (S1101). A method of deriving the temporal merge candidate will be described below with reference to FIG. 12.

The decoder may generate the merge candidate list of the current block based on the derived temporal merge candidates (S1102).

The decoder may generate the prediction block of the current block based on the generated merge candidate list (S1103).

Figure 12:
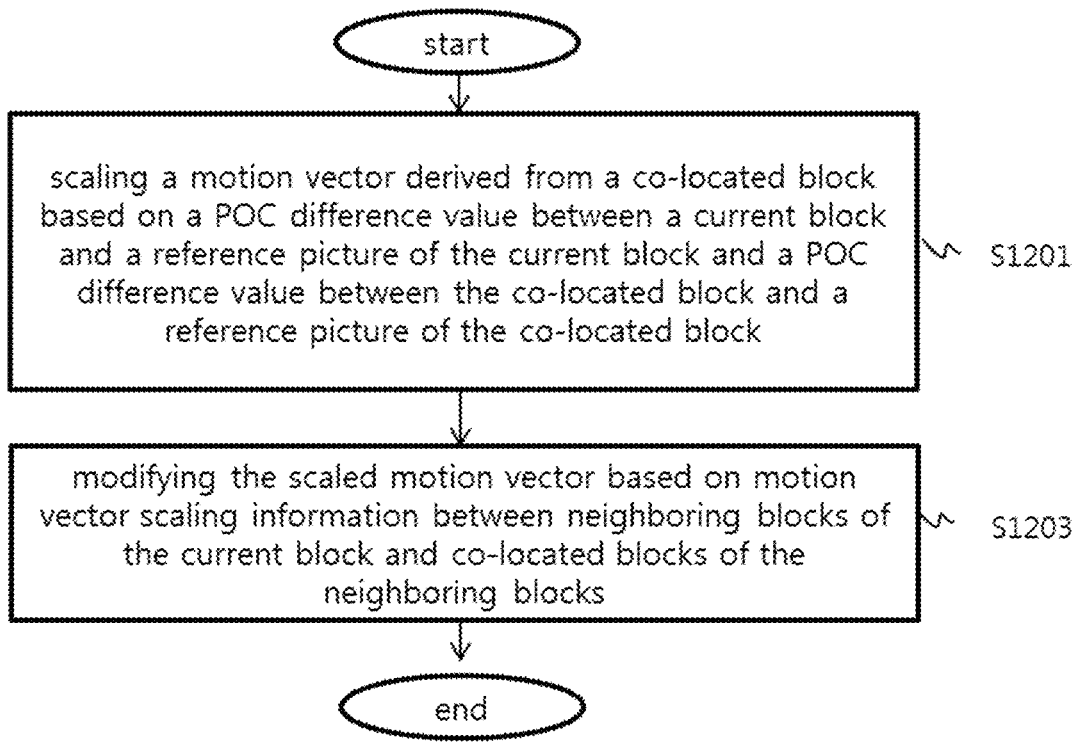
FIG. 12 is a flowchart illustrating a method of deriving temporal merge candidates, according to the present invention.

FIG. 12 illustrates a method of deriving a temporal merge candidate, according to one embodiment of the present invention.

Referring to FIG. 12, the decoder may scale the motion vector derived from the co-located block, based on POC different value tb between the current block and the reference picture of the current block and on a POC difference value td between the co-located block and the reference picture of the co-located block (S1201). Since the scaling method has been described above with reference to FIG. 8, a further description thereof will be omitted here.

The decoder may modify the motion vector scaled based on the motion vector scaling information between the neighboring block of the current block and the co-located block of the neighboring block (S1202).

Here, the motion vector scaling information between the neighboring block of the current block and the co-located block of the neighboring block may be generated in a manner described below. That is, the method of generating the motion vector scaling information includes a process of scaling the motion vector derived from the co-located block of the neighboring block, based on a POC difference value between the neighboring block and the reference picture of the neighboring block and a POC difference value between the co-located block of the neighboring block and the reference picture of the co-located block of the neighboring block, and a process of generating the motion vector scaling information between the neighbor block and the co-located block of the neighboring block, based on a ratio of the motion vector obtained by scaling the motion vector derived from the co-located block of the neighboring block with respect to the motion vector of the neighboring block.

Meanwhile, the modification of the scaled motion vector may be performed by applying a weighted value, which is based on the motion vector scaling information between the neighboring block and the co-located block of the neighboring block, to the scaled motion vector.

When the POC difference value between the current block and the reference picture of the current block differs from the POC difference value between the neighboring block and the reference picture of the neighboring block, the decoder may modify the weighed value, based on a difference value between the POC difference values.

In addition, the decoder may select a neighboring block to be used for the modification of the scaled motion vector, among the spatial neighboring blocks of the current block and the temporal neighboring blocks of the current block, based on the positional information of the neighboring blocks.

In addition, the decoder may select a block having a reference picture the same as that of the current block, among the spatial neighboring blocks of the current block, as a neighboring block to be used for the modification of the scaled motion vector.

Since a detailed description about the method of modifying the scaled motion vector is provided above with reference to FIG. 10, a duplicate description will not be made here.

The method of deriving a temporal merge candidate illustrated in FIGS. 11 and 12 may be performed in the same manner even in the encoder.

Figure 13:
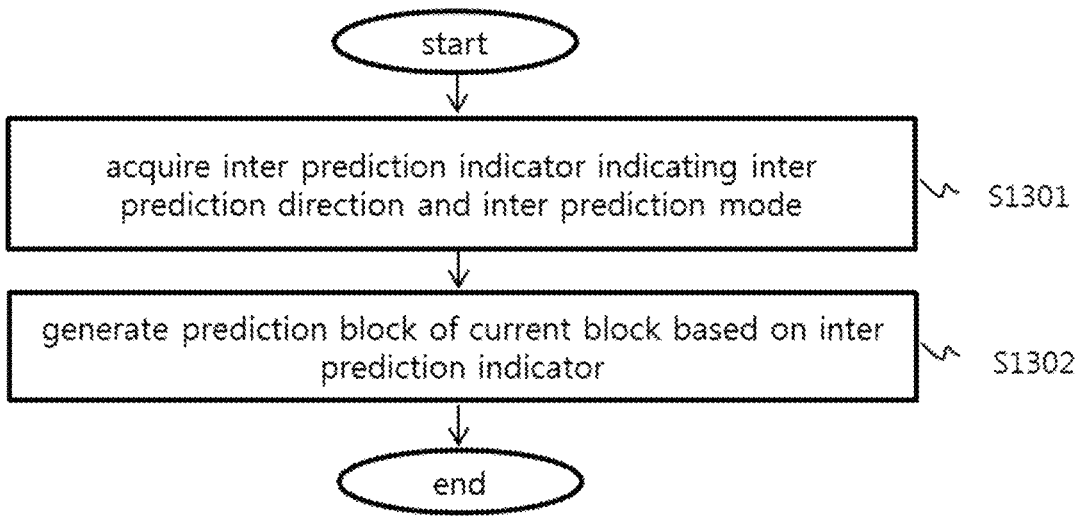
FIG. 13 is a flowchart illustrating an image decoding method according to the present invention.

FIG. 13 is a diagram illustrating an image decoding method according to one embodiment of the present invention.

Referring to FIG. 13, the decoder may acquire an inter-picture prediction indicator indicating an inter-picture prediction direction and an inter-picture prediction mode (S1301). Here, the inter-picture prediction indicator may indicate an inter-picture prediction mode for each prediction direction.

The decoder may generate the prediction block of the current block based on the inter-picture prediction indicator (S1302).

Figure 14:
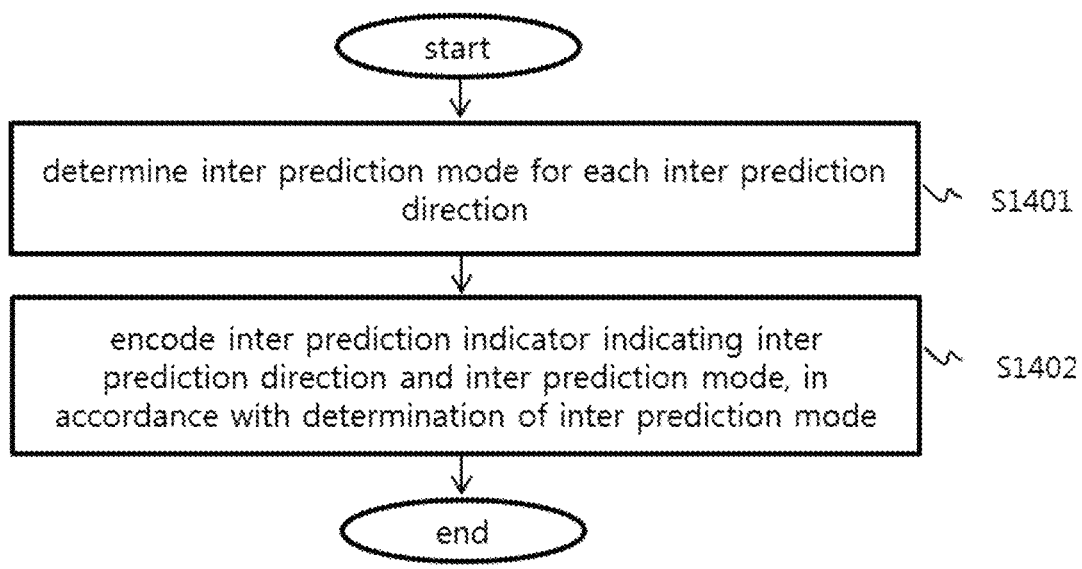
FIG. 14 is a flowchart illustrating an image encoding method according to the present invention.

FIG. 14 is a diagram illustrating an image encoding method according to one embodiment of the present invention.

Referring to FIG. 14, the encoder may determine an inter-picture prediction mode for each inter-picture prediction direction (S1401).

In addition, the encoder may encode the inter-picture prediction indicator indicating an inter-picture prediction direction and an inter-picture prediction mode, according to the determination method of S1401 (S1402).

Since the inter-picture prediction indicator of FIGS. 13 and 14 has been described above, a duplicated description will not be made here.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention can be used for an image encoding/decoding apparatus.

The invention claimed is:

1. A method for decoding an image, the method comprising:
   deriving a first prediction block of a current block;
   deriving a second prediction block of the current block; and
   generating a final prediction block of the current block by applying weights of the current block to first prediction block and the second prediction block,
   wherein the weights of the current block are decoded by a truncated rice binarization.

2. The method of claim 1, wherein the weights of the current block are derived based on a Picture Order Count (POC) of a current picture including the current block.

3. The method of claim 1, wherein the weights of the current block are derived based on a Picture Order Count (POC) of a current picture including the current block and a POC of a reference picture of the current picture.

4. A method for encoding an image, the method comprising:
   deriving a first prediction block of a current block;
   deriving a second prediction block of the current block; and
   generating a final prediction block of the current block by applying weights of the current block to first prediction block and the second prediction block,
   wherein the weights of the current block are encoded by a truncated rice binarization.

5. The method of claim 4, wherein the weights of the current block are derived based on a Picture Order Count (POC) of a current picture including the current block.

6. The method of claim 4, wherein the weights of the current block are derived based on a Picture Order Count (POC) of a current picture including the current block and a POC of a reference picture of the current picture.

7. A non-transitory computer-readable recording medium storing a bitstream generated by the encoding method, wherein the encoding method comprising:
   deriving a first prediction block of a current block;
   deriving a second prediction block of the current block; and
   generating a final prediction block of the current block by applying weights of the current block to first prediction block and the second prediction block,
   wherein the weights of the current block are encoded by a truncated rice binarization.

* * * * *